United States Patent [19]

Athanas et al.

[11] Patent Number: 4,724,520
[45] Date of Patent: Feb. 9, 1988

[54] MODULAR MULTIPORT DATA HUB

[75] Inventors: Peter M. Athanas, South Windsor; Gregory A. Portanova, Enfield, both of Conn.

[73] Assignee: United Technologies Corporation, Hartford, Conn.

[21] Appl. No.: 750,923

[22] Filed: Jul. 1, 1985

[51] Int. Cl.⁴ ............................................. G06F 13/38
[52] U.S. Cl. ................................................. 364/200
[58] Field of Search ........................ 364/200 MS File

[56] References Cited

U.S. PATENT DOCUMENTS 4,253,144 2/1981 Bellamy et al. ..................... 364/200
4,354,225 10/1982 Frieder et al. ....................... 364/200

Primary Examiner—Thomas M. Heckler
Attorney, Agent, or Firm—Francis J. Maguire, Jr.

[57] ABSTRACT

A data hub for facilitating and effecting data transfers between signal processors with high efficiency is disclosed. The data hub receives low priority data transfer instructions from a master CPU and is capable of transferring such low priority data between processors without imposing significant overhead burdens on either the data source or destination. The hub may have the further capability of asynchronously receiving intermediate priority data transfers, storing the received data and transferring it to a destination unit before any further low priority transfers are effected. The hub may have the further capability of asynchronously receiving high priority transfer requests which are effected by the hub before both intermediate and low priority transfers. The hub may be used as a keystone building block for use in linking signal processors.

4 Claims, 16 Drawing Figures

READ AND WRITE DECODES

LOWER BYTE

| | D8 | D7 | D6 | D5 | D4 | D3 | D2 | D1 | |
|---|---|---|---|---|---|---|---|---|---|
| WR 0 | | | | | | | | | RX1 ADD PNTR |
| WR 1 | | | | | | | | | RX2 ADD PNTR |
| WR 2 | | | | | | | | | TX1 ADD PNTR |
| WR 3 | ←  | | | COUNT | | | | → | TX1 WRD CNT |
| WR 4 | | | | | | | | | TX2 ADD PNTR |
| WR 5 | ← | | | COUNT | | | | → | TX2 WRD CNT |
| WR 6 | | | | | | | | | SS1 BLK ADD PNTR |
| WR 7 | | | | | | | | | SS2 BLK ADD PNTR |
| WR 8 | ← | | | COUNT | | | | → | BLK WRD CNT |
| WR 9 | LS2 EN | LS1 EN | CH6 BXFR | CH5 TX2 | CH4 TX1 | CH3 RCV2 | CH2 RCV1 | CH1 XREQ | MASK AND ENBL WORD |
| WR 10 | | | | | | | | | LOAD TX1 DIRCT |
| WR 11 | | | | | | | | | LOAD TX2 DIRCT |
| WR 12 | | | | | | | | | XFR IMM TO SS2 |
| WR 13 | | | | | | | | | WRITE SS1 TO 2 MLBX |
| RD 0 | | | | | | | | | READ RX1 |
| RD 1 | | | | | | | | | READ RX2 |
| RD 2 | MLBX DATA AVLB | DIR BIT | BWC >0 | XMTR 2 WC>0 | XMTR 1 WC>0 | RX2 BSY | RX1 BSY | MLBX DATA AVLB | READ STATUS WORD |
| RD 3 | | | | | | | | | READ MLBX 2 TO 1 |
| RD 4 | LS2 EN | LS1 EN | CH6 BXFR | CH5 TX2 | CH4 TX1 | CH3 RCV2 | CH2 RCV1 | CH1 XREQ | MASK AND ENBL WORD |
| RD 5 | | | | | | | | | READ MLBX 1 TO 2 |
| WR 14 | | | | | | | | | WRITE 2 TO 1 MLBX |

FIG. 15A

READ AND WRITE DECODES — UPPER BYTE

| | D16 | D15 | D14 | D13 | D12 | D11 | D10 | D9 | |
|---|---|---|---|---|---|---|---|---|---|
| WR 0 | | | | | | | | | RX1 ADD PNTR |
| WR 1 | | | | | | | | | RX2 ADD PNTR |
| WR 2 | | | | | | | | | TX1 ADD PNTR |
| WR 3 | X | X | X | X | X | X | REST RX1 | SELF TEST | TX1 WRD CNT |
| WR 4 | | | | | | | | | TX2 ADD PNTR |
| WR 5 | | | | | | | REST RX2 | SELF TEST | TX2 WRD CNT |
| WR 6 | | | | | | | | | SS1 BLK ADD PNTR |
| WR 7 | | | | | | | | | SS2 BLK ADD PNTR |
| WR 8 | X | X | X | X | X | X | X | DIR BIT | BLK WRD CNT |
| WR 9 | SS2→1 MBX AVLBL | SS2 BLK DONE | TX2 BLK DONE | TX1 BLK DONE | RX2 RDY | RX1 RDY | TX2 EMP | TX1 EMP | MASK AND ENBL WORD |
| WR 10 | | | | | | | | | LOAD TX1 DIRCT |
| WR 11 | | | | | | | | | LOAD TX2 DIRCT |
| WR 12 | | | | | | | | | XFR IMM TO SS2 |
| WR 13 | X | X | X | X | X | | | | WRITE SS1 TO 2 MLBX |
| RD 0 | | | | | | | | | READ RX1 |
| RD 1 | | | | | | | | | READ RX2 |
| RD 2 | RX2 RDY | RX1 RDY | TX2 EMP | TX1 EMP | RX2 BLK VLD | RX1 BLK VLD | RX2 TX2 TEST | RX1 TX1 TEST | READ STATUS WORD |
| RD 3 | | | | | | | | | READ MLBX 2 TO 1 |
| RD 4 | SS2→1 MLBX AVLB | SS2 BLK DONE | TX2 BLK DONE | TX1 BLK DONE | RX2 RDY | RX1 RDY | TX2 EMP | TX1 EMP | MASK AND ENBL WORD |
| RD 5 | SS1→2 MBX AVLBL | SS2→1 MBX AVLBL | BLK XFR ENBLD | BWC >0 | DIR BIT | | | | READ MLBX 1 TO 2 |
| WR 14 | | | | | | | | | WRITE 2 TO 1 MLBX |

FIG. 15B

MODULAR MULTIPORT DATA HUB

TECHNICAL FIELD

This invention relates to multiple processor and to distributed processor systems, and more particularly to means for transferring data between distributed processors and between multiple processors.

BACKGROUND ART

Multiprocessor system architectures for distributed processing often employ shared common memory between processors. This may be accomplished in a multiprocessor system using multiport memories, or architectures including cross bar switches, a time-shared common bus, or a dual-bus structure.

A multiport memory system employs separate buses between each memory module and each processor. Each processor bus is physically connected to each memory module. Each memory module is multiported, each port accommodating one of the buses. Each memory module may have internal control logic to determine which port will have access to memory at any given time. Memory access conflicts are resolved by assigning priorities to each memory port. High transfer rates can be achieved because of the multiple paths between processors and memory.

A multiprocessor cross bar switch architecture provides switched cross points placed at intersections between processor buses and memory module paths. Each switch point has control logic to set up the physical transfer path between a processor and memory. The control logic examines the address that has been placed on the bus to determine whether its particular module is being addressed and also to resolve multiple requests for access to the same memory module on a predetermined priority basis.

In a multiprocessor time-shared architecture, a number of processors may be connected through a common path to a memory unit. In such a system only one processor can communicate with the memory at any given time. Transfer operations are controlled by the processor that is in control of the bus at any given time. Any other processor wishing to initiate a transfer must first determine the availability status of the bus, and only after the bus become available can the processor address the memory unit to initiate the transfer. The system may exhibit memory access conflicts since one common bus is shared by all processors. Memory contention must be resolved with a bus controller that establishes priorities among the requesting units. The time-shared architecture is disadvantageous because when one processor is communicating with the memory, all other processors are either busy with internal operations or must be idle waiting for the bus.

A more efficient architecture than the time-shared common bus multiprocessor architecture is a dual-bus multiprocessor organization in which a number of local buses are each connected to a local memory and to one or more processors. System bus controllers associated with each local bus are used to link each local bus to a common system bus. In most designs, the devices connected to the local bus are available to the local processors only. Memory connected to the common system bus is shared by all processors. The system may be configured to permit devices attached to the local bus to be accessed by processors on other local buses. Only one processor can communicate with the shared memory and any other common resources through the system bus at any given time. The other processors on the local buses are kept busy communicating with their local memory and local devices. Although such a system qualifies as a multiprocessor system, it can also be classified more correctly as a multiple computer system. This is because when a processor, memory, and other devices are connected together on a local bus the local group constitutes a computer system in its own right.

For safety reasons many systems are organized in a redundant fashion having multiple computers operating independently. Other redundant systems permit semiautonomous operation of distributed processors and provide that a failed processor or related device can be severed from the system without catastrophically degrading overall system operation.

Distributed multiple processor systems must operate semiautonomously to obtain maximum efficiency. To acheive near independence despite their interconnected communication links they must utilize some means of transferring data between distributed processors which avoids processor overhead. This may be acheived to some degree by using multiport memory units having physically isolated address and data input buses for each port. Hand-shaking between processors provides the necessary control for transferring data between processors using the multiport memory unit as an intermediary. Although the use of shared memory provides a degree of addressing freedom, only one processor is allowed access to the memory at any given point in time. This restriction may not be acceptable for some system design requirements, i.e., it may not be acceptable to deprive a processor of free access to memory.

A partial solution to the problem of system requirements not permitting the "wait" states dictated by shared memory is the use of a first-in-first-out (FIFO) buffer between processors. In this way no processor is deprived of immediate access to memory and freedom of data flow is therefore ensured. Data may be input and output at two different rates and the output data are always in the same order in which data entered the buffer. For bidirectional flow FIFO buffers may be employed in both directions. However, the freedom of addressing acheived with shared memory is lost in the FIF buffer solution.

In addition to the individual advantages of the shared memory and FIFO buffer approaches described above, both approaches still suffer, despite the isolation provided by additional memory, from a certain lack of processing independence which is most desirable. In the case of a shared memory the denial of access to a processor at any given time results in undesirable wait states which decrease system efficiency. In the case of CPU buffered by FIFOs the information which may be provided by shared addressing is not available. I.e., while a CPU can control the position assignment of data when writing into a FIFO, it has no control of the assignment of data when reading from a FIFO. In other words, the reading CPU may have to read data of no present interest before getting to the stored position of present interest.

The desirability of providing more efficient processing for distributed processors becomes more important as the complexity of the system increases. As the number of processors increases and the intercommunication requirements become more complex, the disadvantageous opportunities for creating undesirable wait states also increase. Thus, a means of increasing processing efficiency while maintaining or increasing relative semi-autonomous operation is needed.

DISCLOSURE OF THE INVENTION

The object of the present invention is to provide a keystone building block for use in linking processors which functions as a modular multiport data hub for facilitating and effecting data transfers between processors with high efficiency.

According to the present invention, a control processor or master CPU and an associated memory together may exchange data with one or more distributed devices, which may include other processors having similar associated memory units, by linking the control processor and its associated memory to each of the other devices and their associated memories, if any, with a modular multiport data hub. After initialization by the master CPU, the data hub may generate data transfer requests at the behest of the master CPU to one or more of the linked devices. Upon generation of one or more requests the data hub initiates a request for a data transfer to the device designated as a data source by the master CPU. The generation of a request by the hub to the designated data source initiates a direct memory access cycle. It is the prerogative of the data source to continue processing, or relinquish control to the hub. Instruction processing of the data source is undisturbed. Once the hub has obtained the required data from the data source it will then store the data and attempt to transfer the data to a designated destination unit at the convenience of the destination unit. Thus, the hub will inform the destination unit that it has data ready for transfer and will wait until the destination unit decides that it is convenient to accept the data. Once the destination unit signals the hub that it should proceed with the transfer, the destination unit may resume executing any unrelated program which requires immediate attention while the hub is granted direct access to the destination unit's associated memory. Depending on the particular processor used at the destination, it may be required to wait during the transfer until it is complete before returning to normal program execution. The hub may include plural parallel format data channels only or combinations of parallel and serial format channels.

In further accord with the present invention, each of the channels may have a programmable priority established within the hub which permits the arbitration of competing data transfer requests from the various devices associated with each of the channels. Thus, if one or more transfer requests are received by the hub from separate channels having different assigned priorities, the device having the highest priority will be granted transfer access first while the competing channel's or channels' request(s) will be put in a request queue and each will be granted transfer access after all higher priority transfers have been effected according to the programmed transfer priorities. The priority scheme may be structured so as to permit interruption of lower priority transfers in progress when a higher priority transfer request occurs. Such a lower priority transfer can be resumed after the higher priority transfer has been effected.

In still further accord with the present invention, a maskable interrupt line may be provided in the hub which is reprogrammable to be responsive to a selected combination of independent interrupt conditions.

In still further accord with the present invention, the multiport data hub according to the present invention may be used as a keystone element in the construction of distributed processor systems. Its use as a modular building-block-like device as a hub for interfacing between multiple processors provides a versatile construction element which provides highly desirable independence between distributed subsystems. Thus, a multiplicity of processors may be interfaced to a modular multiport data hub and a plurality of modular multiport data hubs may be linked to each other in constructing a complex distributed processor system having numerous multiprocessor subsystems. Each modular multiport data hub functions as a data transfer focal point in an overall system having numerous such data transfer focal points.

Thus, the modular multiport data hub, according to the present invention, is a modular building-block-like device which constitutes a data hub which may be replicated as often as required in the construction of distributed processor systems in particular and which may also be used for more limited purposes in multiple processor applications. It combines the addressing independence of shared bus systems such as dual port RAMs with the freedom of information flow of FIFO architectures by implementing a multi-channel interface device, each channel having a DMA structure. Data may be transferred between distributed processors with very little processor overhead.

These and other objects, features and advantages of the present invention be will become more apparent in the light of the following detailed description of an exemplary embodiment thereof as illustrated in the accompanying drawing.

BRIEF DESCRIPTION OF DRAWINGS

FIGS. 15A & 15B are an illustration of word definitions for the data hub of FIGS. 9A & 9B. FIGS. 15A & 15B illustrate the lower and upper bytes of each word, respectively.

BEST MODE FOR CARRYING OUT THE INVENTION

Figure 1A:
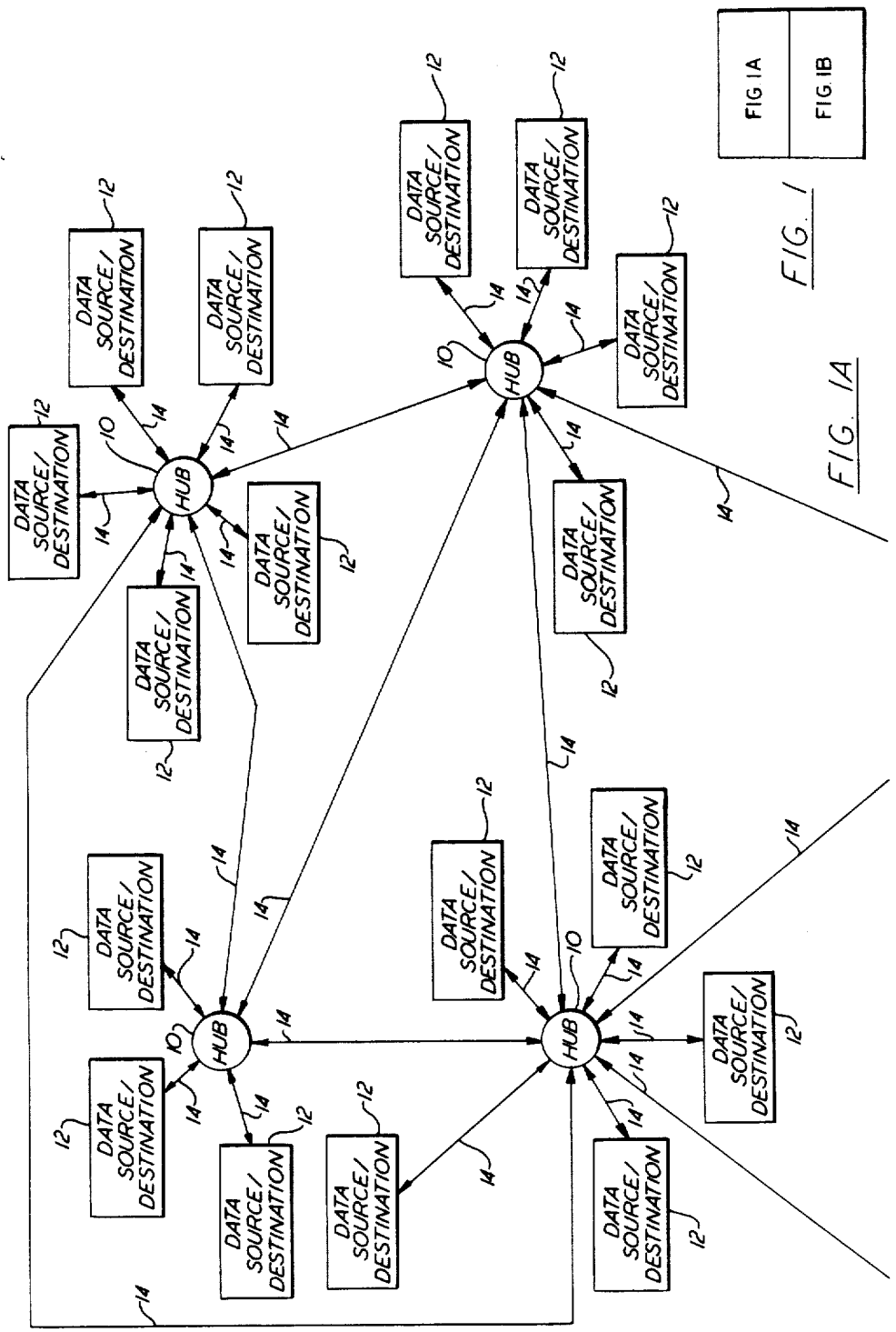
FIGS. 1A & 1B, arranged as shown in FIG. 1, are an illustration of a distributed processor system having a plurality of modular multiport data hubs, according to the present invention, utilized as keystone building blocks.
Figure 1B:
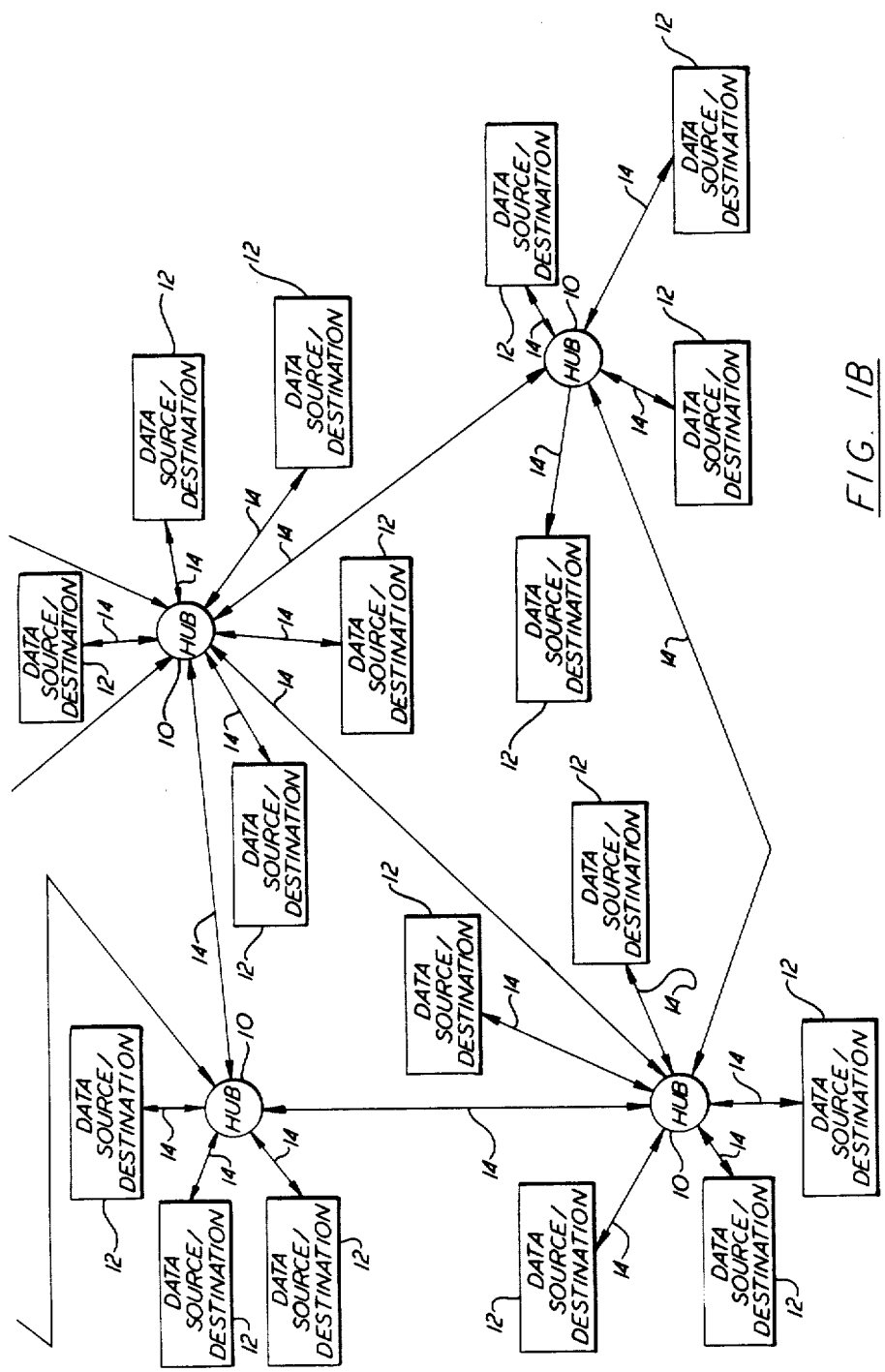

FIGS. 1A & 1B are an illustration of a distributed processor system having a plurality of modular multiport data hubs 10 according to the present invention. Each hub interfaces with a plurality of data source/destination units 12 each of which may be any one or more of a variety of devices including processors with dedicated memory, I/O controllers, I/O devices, interface devices, and many others. The data source/destination units 12 may even include entire systems which could, for example, be exact replicas of the system shown in FIGS. 1A & 1B. Such a redundancy scheme would be used for insuring data integrity. Data links 14 are used to link each data source/destination 12 with an associated modular multiport data hub 10. These links 14 may be serial or parallel, synchronous or asynchronous.

A modular multiport data hub 10, according to the present invention, is intended as a building-block unit for the construction of multi-processor systems, particularly distributed processor systems. However, it should be borne in mind that the data hub of the present invention may also be used in multiple processor systems. The data hub 10 may be used by a system designer as a keystone element which transfers data between source and destination with little or no source/destination processor overhead. A key feature of the hub design is that it does not require the sharing of memory between data sources and data destinations. This permits much of the overhead demanded by previous systems to be eliminated.

Figure 2:
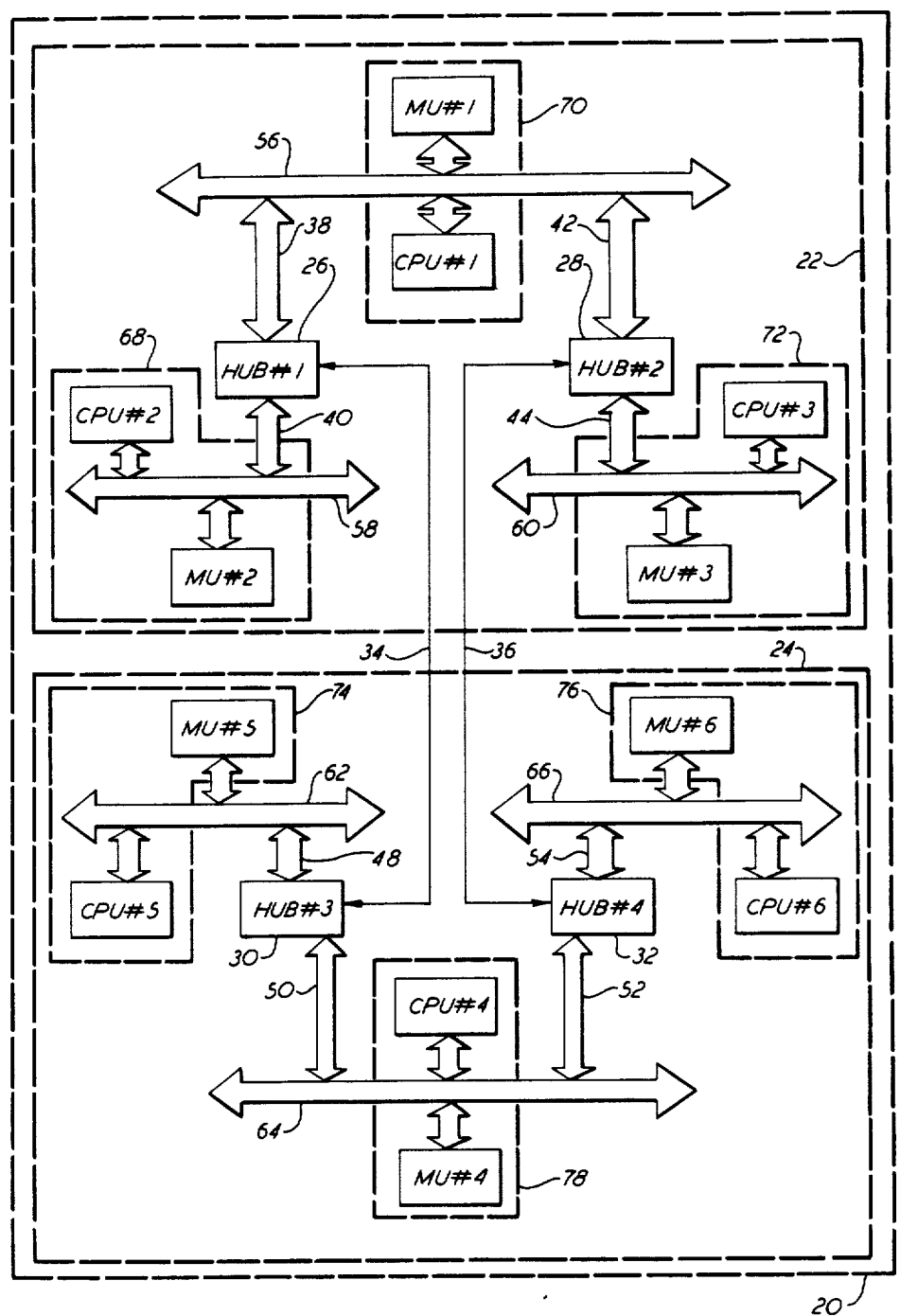
FIG. 2 is an illustration of a system is which a pair of redundant systems are each designed using two data hubs.

FIG. 2 is an illustration of a system 20 in which a pair of redundant systems 22, 24 are each designed using two data hubs 26, 28 and 30, 32. The two systems 22, 24 are able to communicate with one another via two separate serial data links 34, 36. Thus, data hub number 1 26 is serially linked via link 34 to data hub number 3 30. Similarly, data hub number 2 28 is serially linked via serial link 36 to data hub number 4 32. In general, any of the devices within system 22 may communicate with any of the devices within system 24 via either of the serial data links 34, 36. In practice, however, only selected units within a given system will normally communicate with other selected units in another system. In the system architecture of FIG. 2, each hub 26, 28, 30, 32 interfaces via parallel links 38, 40, 42, 44, 48, 50, 52, 54 with a pair of local buses 56 and 58, 56 and 60, 62 and 64, and 64 and 66, respectively.

Each of the local buses 56, 58, 60, 62, 64, 66 interfaces with a group of devices 68, 70, 72, 74, 76, 78. Each group shown in FIG. 2 contains a CPU and a memory unit (MU). Each of the CPUs and MUs are numbered in FIG. 2 assuming that the associated local bus is similarily numbered. In other words, data hub number 1 26 links local bus number 1 56 and local bus number 2 58 along with hub number 3 30. Thus, CPU number 1 may transfer data from its MU number 1 via local bus number 1 56, parallel link 38, and data hub number 1 to any of the other devices in the system 20.

Figure 3:
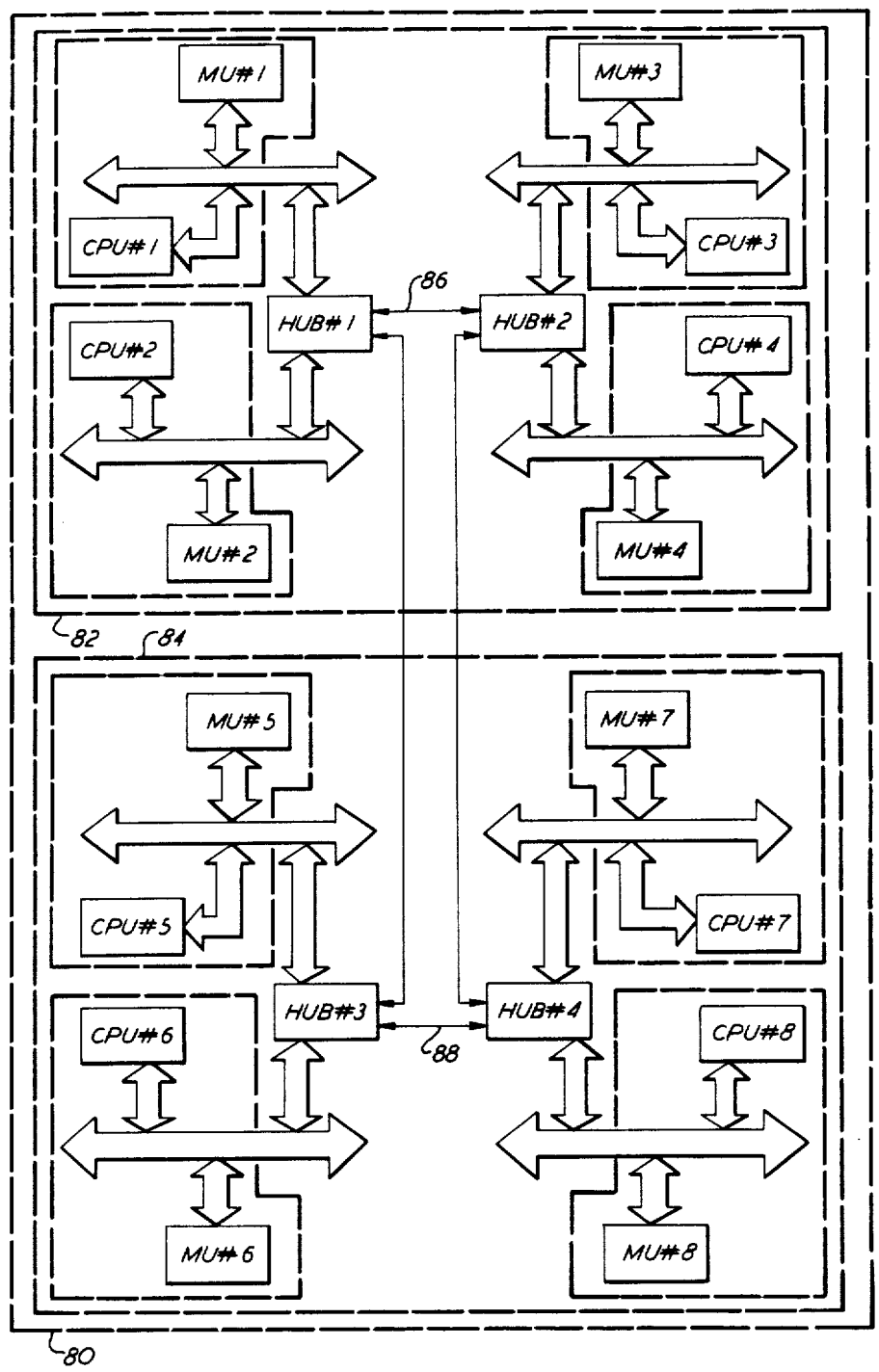
FIG. 3 is another illustration of a redundant system using two data hubs in each subsystem.

Similarily, in FIG. 3, still another redundant system 80 is illustrated having redundant subsystems 82, 84 illustrated. The chief differences between the systems illustrated in FIGS. 2 and 3 are that additional serial data links 86, 88 exist between hubs 1 and 2 and hubs 3 and 4, respectively, and also there is no sharing of local buses between hubs in the same subsystem. Of course, it should be understood that the system architectures illustrated in FIGS. 1A & 1B, 2, and 3 are merely several architectures out of a wide variety of architectures which may be constructed using a modular multiport data hub according to the present invention.

Figure 4:
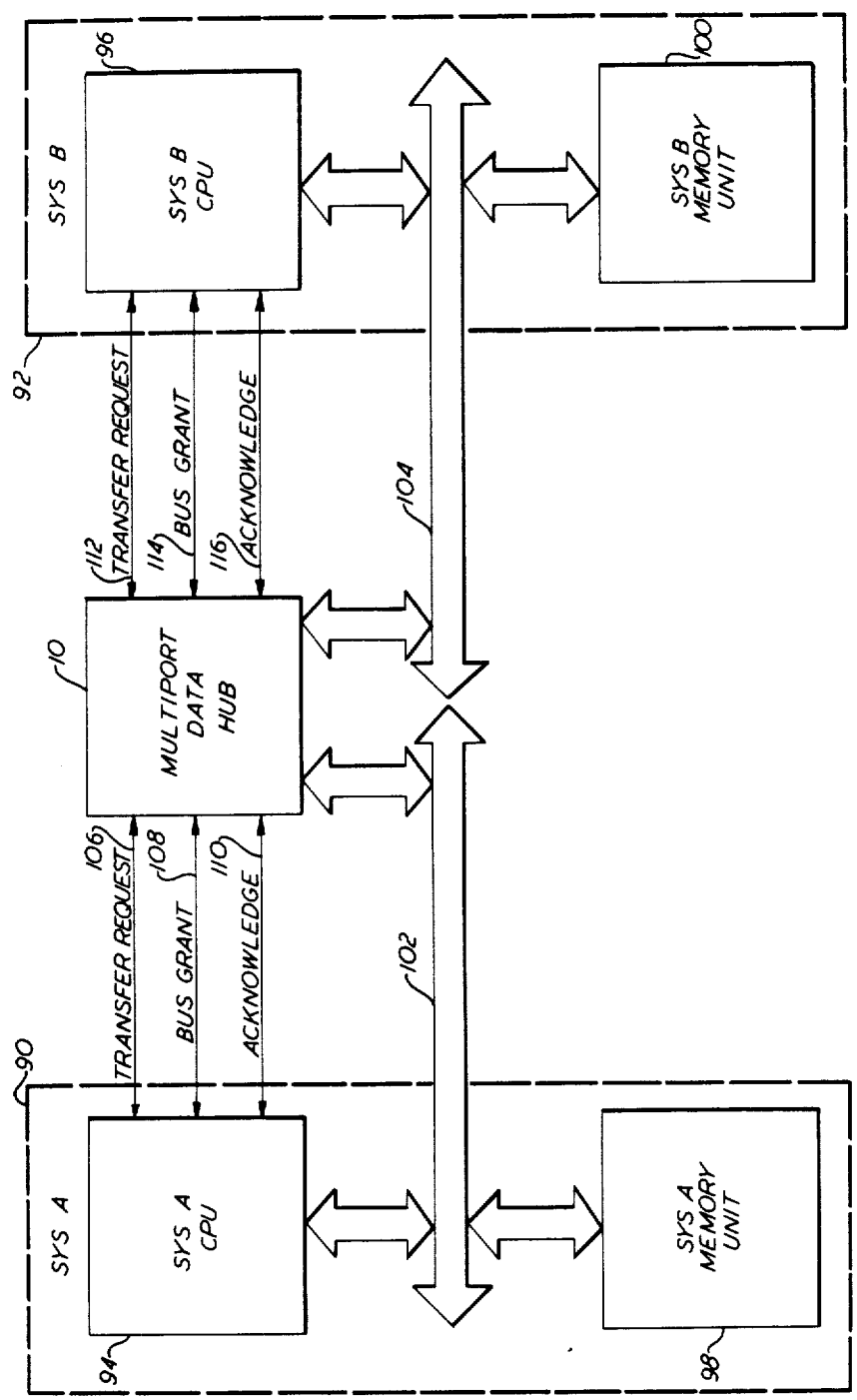
FIG. 4 is a simplified block diagram illustration of a modular multiport data hub, according to the present invention.

FIG. 4 is a simplified block diagram illustration of a modular multiport data hub 10 according to the present invention. The multiport data hub shown in FIG. 4 is a dual port data hub and is presented with only two ports for the sake of simplicity. It should be understood, however, that the inventive concept disclosed herein embraces a plurality of ports within the data hub and the inventive concept is not restricted to dual port data hubs.

The multiport data hub 10 of FIG. 4 is shown interfacing with System A 90 and System B 92. Both System A and System B have a CPU 94, 96 and an associated memory unit 98, 100. Each System's CPU communicates with its associated Memory Unit via data, address, and control buses indicated generally by a single bus line 102, 104. Each of the buses 102, 104 communicates with the multiport data hub 10 separately at separate ports. Thus, there is no sharing of memory between System A and System B.

Handshaking control lines 106, 108, and 110 are provided between System A and the multiport data hub. Similarily, handshaking lines 112, 114, and 116 are provided between System B and the multiport data hub. It should be understood that the three handshaking control lines between the hub and each CPU could be reduced to two handshaking lines between the hub and each of the CPUs. This will depend upon the handshaking philosophy required by the individual CPUs.

Figure 5:
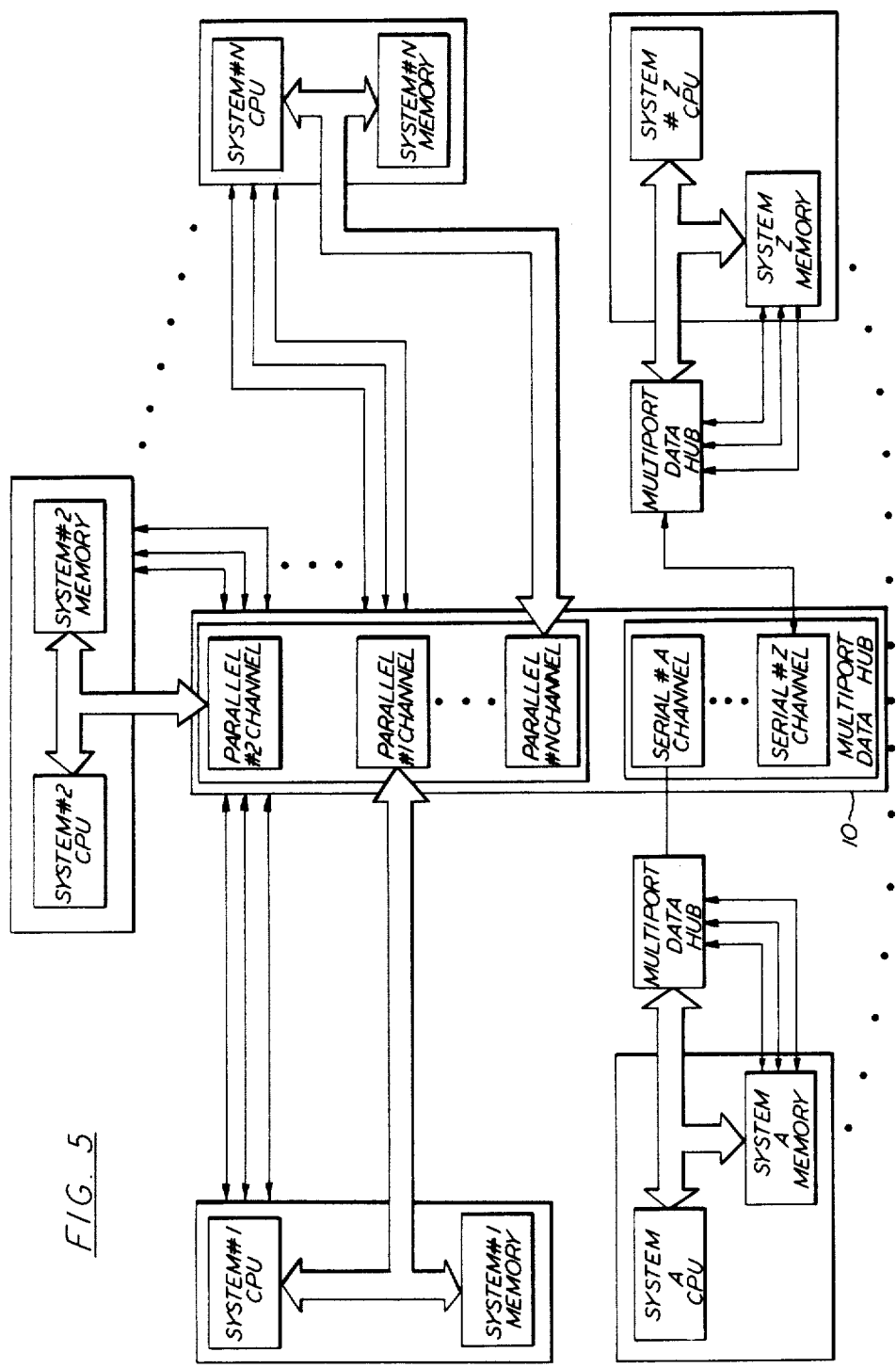
FIG. 5 is a simplified block diagram illustration of a multiport data hub, according to the present invention, which is capable of transferring data between a plurality of parallel and serial channels.

It should also be understood that the multiport data hub illustrated in simplified form in FIG. 4 is not, as mentioned above, restricted to merely a dual port implementation nor is it restricted to merely parallel interfacing. Each hub can be individually configured, limited only by bus bandwidth considerations, to include a large number of parallel channels along with numerous serial channels, as shown in FIG. 5. Bus bandwidth is the maximum transfer rate allowed on a given memory system. For example, a memory unit system having 100 nanosecond access memory devices has a bus bandwidth of 10 Megahertz. This limits the total number of channels to that transfer rate. The overall system can communicate at the bandwidth of the slowest memory unit within the system. Thus, in FIG. 5, a multiport data hub 10 is capable of transferring data between N parallel channels and Z serial channels. In other words, the multiport data hub according to the present invention may be modularized in a wide variety of architectures.

Figure 6A:
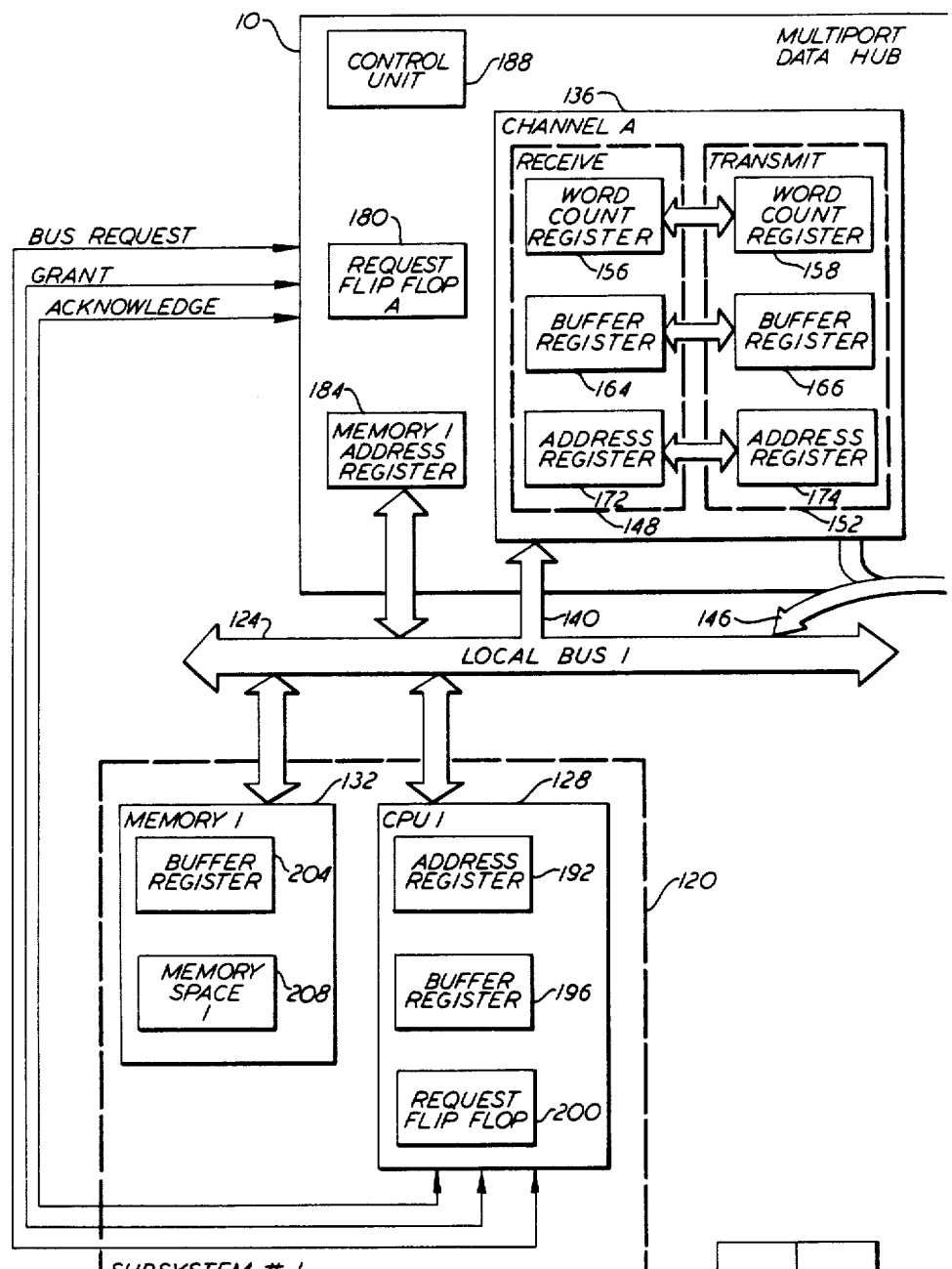
FIGS. 6A & 6B, arranged as shown in FIG. 6, are a simplified block diagram illustration of a multiport data hub, according to the present invention, having only two ports for interfacing with two subsystems.
Figure 6:
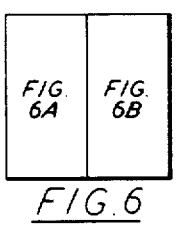
Figure 6B:
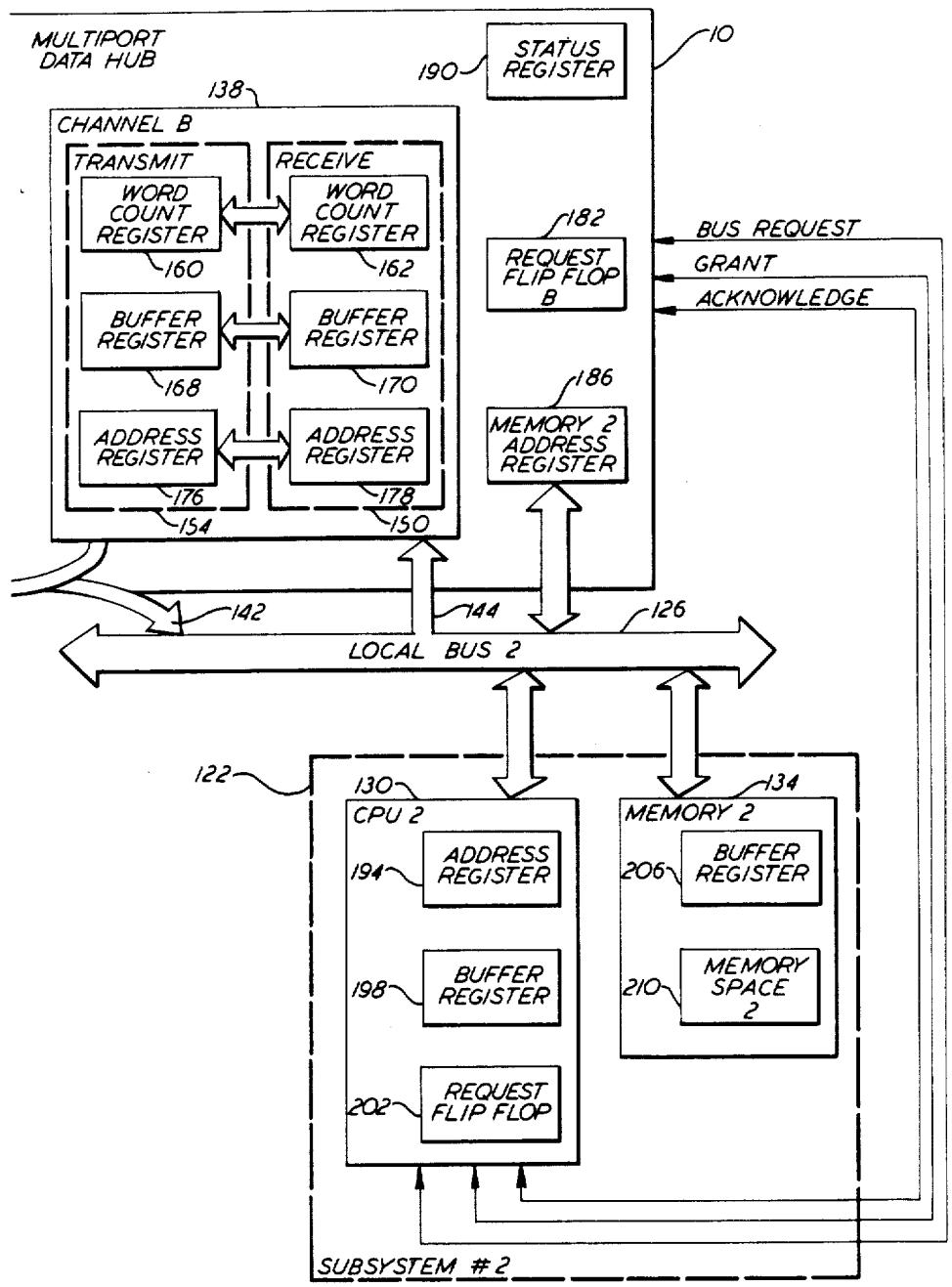

FIGS. 6A & 6B are a simplified block diagram illustration of a multiport data hub 10 having only two ports interfacing with two subsystems 120, 122, as in FIG. 4, except that FIGS. 6A & 6B are slightly more detailed than FIG. 4. Each subsystem 120, 122 interfaces with the multiport data hub 10 via local buses 124, 126, respectively. Each subsystem includes a CPU 128, 130 and a memory unit 132, 134.

The multiport data hub 10 of FIGS. 6A & 6B are shown having two channels 136, 138 each of which communicates with both local bus number 1 124 and local bus number 2 126. Channel A 136 receives parallel information on line 140 from local bus number 1 124 and provides that same information on line 142 to local bus number 2 126. In general, the data received on line 140 will be identical to the data supplied on line 142 while the addresses may or may not be identical. Channel B 138 receives data from local bus number 2 126 on line 144 and provides that same data at the same or a different address on line 146 to local bus number 1 124. Thus, Channel A and Channel B may be characterized as uni-directional parallel data channels. It should be understood, however, that Channel A and Channel B could be combined into a single bi-directional channel according to the present invention. Separate channels may be provided in order to enhance the transfer rate independence of subsystem 1 120 and subsystem 2 122.

Each channel 136, 138 of the multiport data hub is divided into a receive section 148, 150 and a transmit section 152, 154. The various receive and transmit sections include word count registers 156, 158, 160, 162, buffer registers 164, 166, 168, 170, and address registers 172, 174, 176, 178.

The multiport data hub 10 includes a request flipflop 180 associated with Channel A and a similar request flipflop 182 associated with Channel B. Also, a memory address register 184 is associated with Channel A while a similar memory address register 186 is associated with Channel B. The data hub 10 also includes a control unit 188 and a status register 190.

Each of the subsystems' 120, 122 CPUs' 128, 130 include an address register 192, 194, a buffer register 196, 198, and a request flipflop 200, 202. Each of the subsystems' 120, 122 memory units 132, 134 includes a buffer register 204, 206 and a memory unit 208, 210. A transfer of data between subsystem number 1 120 and subsystem number 2 122 will be more easily understood when described in connection with the flow charts of FIGS. 7A and 7B.

Figure 7A:
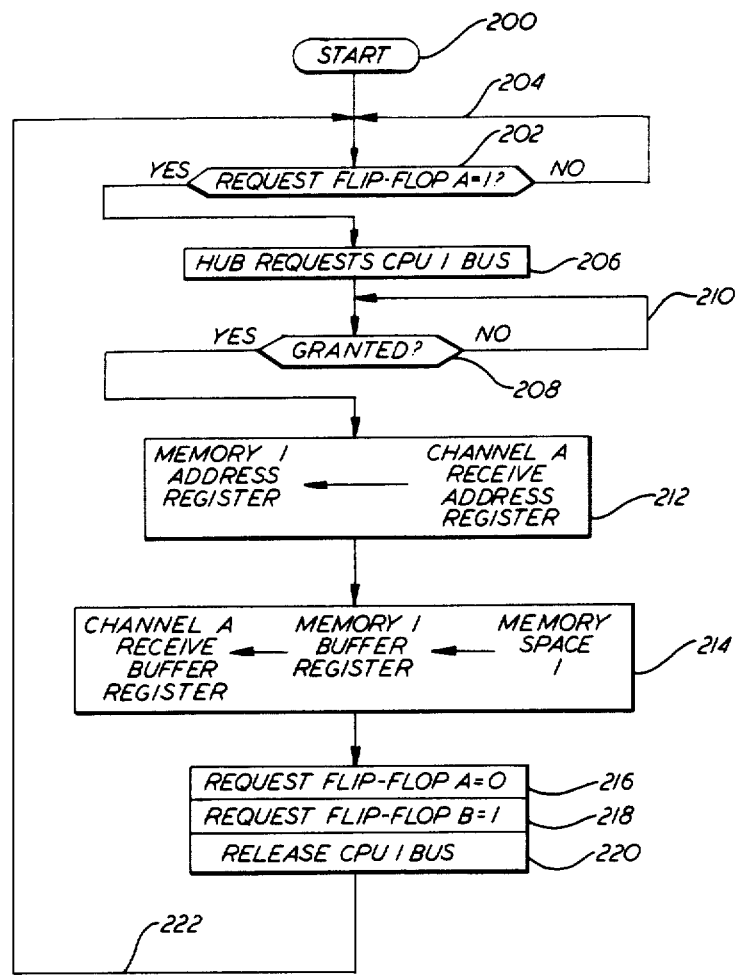
FIGS. 7A & 7B, arranged as shown in FIG. 7, are a simplified illustration of two flowcharts which are illustrative of the steps executed within the multiport data hub of FIGS. 6A & 6B.
Figure 7:
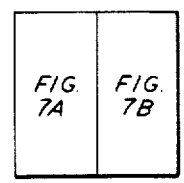
Figure 7B:
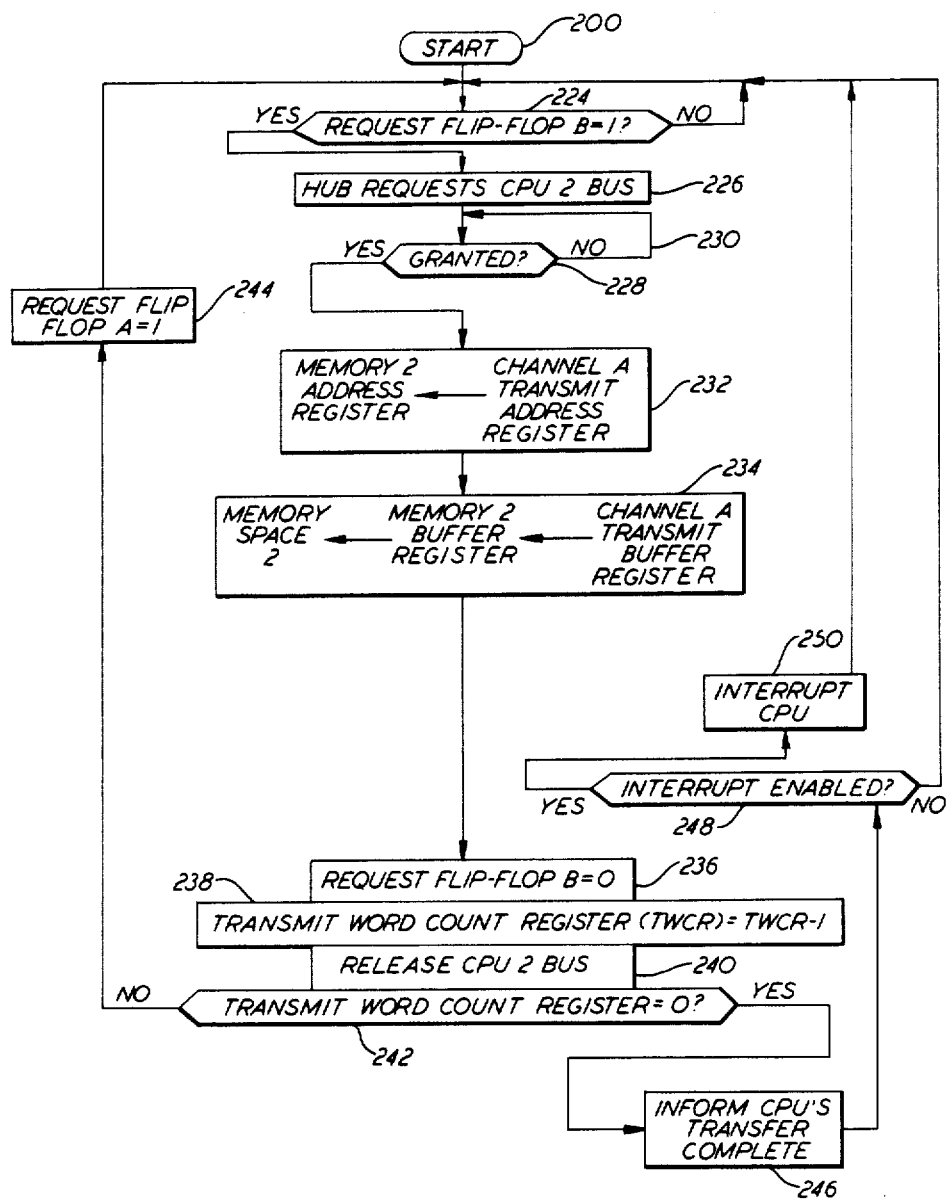

FIGS. 7A & 7B are an illustration, by way of simplified example, of two flowcharts which may run concurrently within the multiport data hub 10 of FIGS. 6A & 6B. Beginning after a start step 200, in FIG. 7A a determination is first made in a decision step 202 as to whether request flipflop A 180 of FIGS. 6A & 6B are equal to one or not. If it is not, no request has been made by any unit for access to subsystem number 1's local bus 124. Therefore, a negative answer will cause the program to loop continuously from step 202 back again to ask the same question again as indicated by a line 204. If a request has been made for local bus 124 a step 206 is next executed in which the multiport data hub 10 actually requests local bus number 1 124. A step 208 next determines whether access has been granted by CPU number 1 128. If not, the program continuously loops through step 208 as indicated by a line 210 until access to the local bus is granted. Once access is granted a step 212 is next executed in which the Channel A receive address register 172 transfers its contents to memory 1 address register 184. Channel A receive address register 172 would have received its contents from either CPU 1 or CPU 2 depending on which is the CPU in control of the system transfers. A step 214 is next executed in which the contents of memory space 1 208 at the addressed location is transfered to memory 1 buffer register 204 and then transfered to Channel A receive buffer register 164. The request flipflop A is then set equal to zero in a step 216, request flipflop B is set equal to one in a step 218, and local bus 1 124 is released in a step 220. The program then loops back to step 202 as indicated by a line 222.

As soon as request flipflop B is set equal to one in step 218, the change is detected in a step 224 as shown in FIG. 7B. Previous to the detection in step 224 of a change to a state equal to one, the program shown in FIG. 7B would have been looping repeatedly through step 224 until a request is detected. After detection, a step 226 is next executed in which the data hub 10 requests access to local bus 2 126. A decision step 228 is next executed in which a determination of whether access to the CPU bus has been granted or not is made. If not, a continuous loop indicated by a line 230 is executed repeatedly until access is granted. Once granted, a step 232 is next executed in which the contents of Channel A transmit address register 174 are transfered to memory 2 address register 186. In the next step 234, the data contained in the Channel A transmit buffer register 166 is transfered to the memory 2 buffer register 206 and then into the proper address at memory space 2 210. The transmit buffer register 166 would have received its contents from the receive buffer register 164 under the control of the control unit 188. Similar transfers between the other blocks within the receive and transmit sections will also have occurred prior to any transfer. The request flipflop B is then set equal to zero in a step 236. The contents of the transmit word count register 158 is then decremeted by one in a step 238 and the bus 2 126 is then released in a step 240. A decision is then made in a step 242 as to whether the transmit word count register is equal to zero or not. If not, request flipflop A is set equal to one in a step 244 and the steps following step 202 of the FIG. 7A are then repeatedly reexecuted until all words have been transfered.

If the word count register in step 242 of FIG. 7B was found to be equal to zero, the CPUs are then informed in a step 246 that the transfer is complete. A step 248 is then executed to determine whether the maskable interrupt has been enabled by the master CPU. If the interrupt is enabled a designated CPU is interrupted in a step 250 and a return is made to step 224. If the interrupt was not enabled the program returns immediately to step 224 without interrupting any CPU. Of course, it will be understood that the flow program can be implemented using a state machine.

Figure 8:
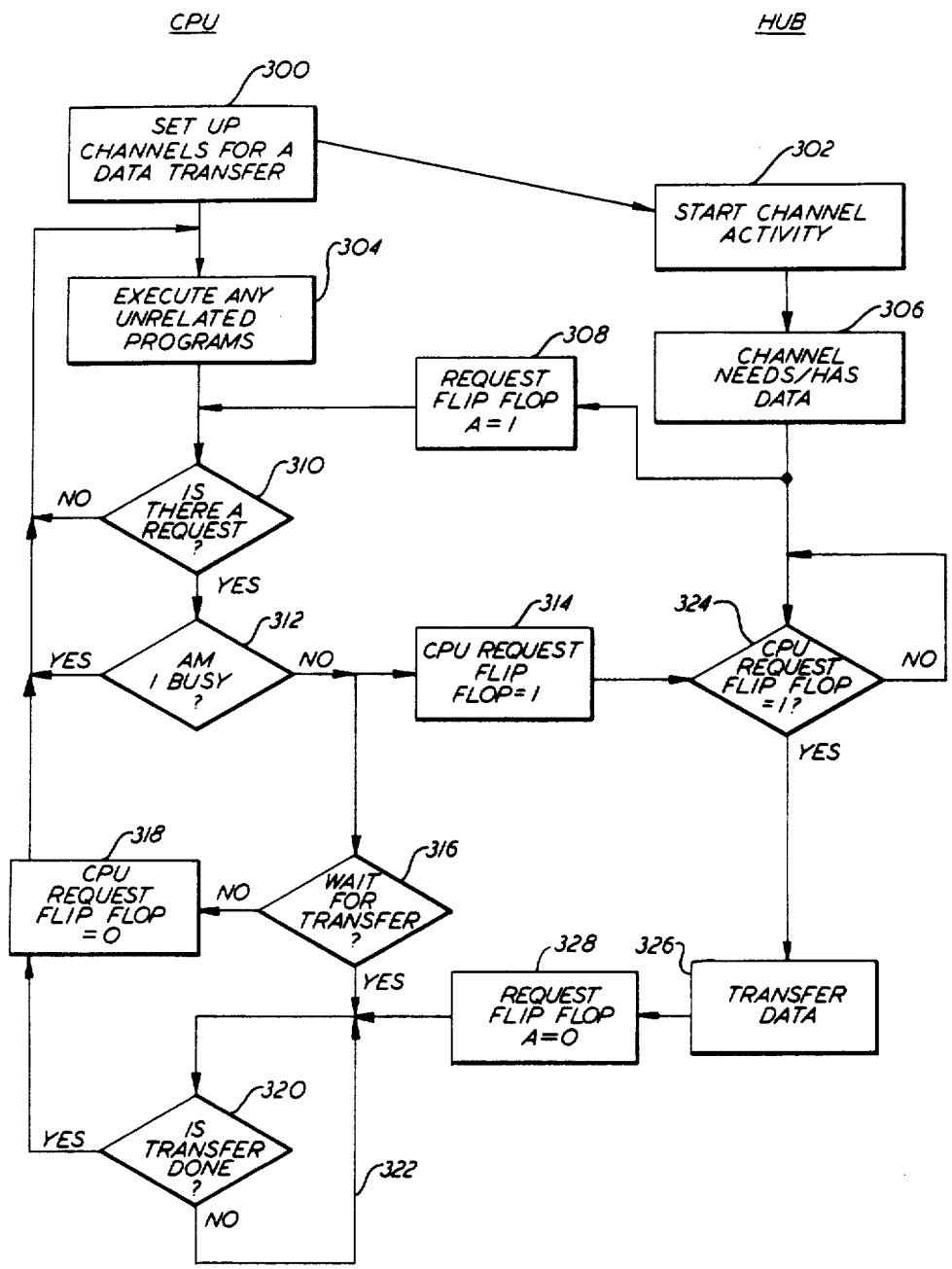
FIG. 8 is a flowchart illustration of the steps executed in a typical subsystem CPU while at the same time showing the steps executed in the multiport data hub, according to the present invention.

A simplified flowchart in FIG. 8 shows the sequence of events in a CPU in a typical subsystem and at the same time the sequence of events taking place in the multiport data hub. One may imagine an imaginary timeline running from the top of the figure to the bottom. In this case, the CPU is the control CPU and it first sets up the channels in the data hub for a data transfer in a step 300. The data hub responds by starting channel activity in a step 302. Meanwhile, the CPU is free to execute any unrelated programs as shown in a step 304. When the channel determines that it needs or has data for transfer in a step 306 it will set request flipflop A equal to 1 in a step 308. The CPU periodically executes a step 310 to determine whether a request exists or not. If not, a return is made to executing any unrelated programs in step 304. If so, the CPU determines in a step 312 whether it is busy or not. If so, a return is made to execute any unrelated programs in step 304. If not, the CPU sets its request flipflop equal to 1 in a step 314 and at the same time, depending on the particular implementation, determines whether it will wait for the transfer to be complete. If the particular processor implementation does not require the CPU to wait for the transfer to be complete, the CPU determines in a step 316 that it is unnecessary to wait for the transfer to be complete and a step 318 is next executed in which the CPU request flipflop is set equal to zero again. If, because of the particular processor implementation, it is necessary to wait for the transfer to be complete before proceding to execute any unrelated programs, the CPU will determine in step 316 that a wait for a transfer is required and a step 320 will next be executed in which a determination is repeatedly made as to whether the transfer is complete or not. If not, step 320 is reexecuted repeatedly as indicated by a line 322 until the transfer is complete. Once the transfer is complete step 318 is next executed where the CPU request flipflop is reset to zero and control is once again returned to step 304 and unrelated programs may continue to be executed by the CPU.

After the CPU request flipflop was set equal to one in step 314, the data hub, which will already have been waiting in a step 324 for the CPU request flipflop to be set equal to one in step 314, will next execute a step 326 in which the data transfer is effected between the hub and the CPU. After the transfer is complete, the data hub will set its request flipflop A equal to zero again in step 328 and this will signify to the CPU in step 320 that the transfer is complete.

Figure 9A:
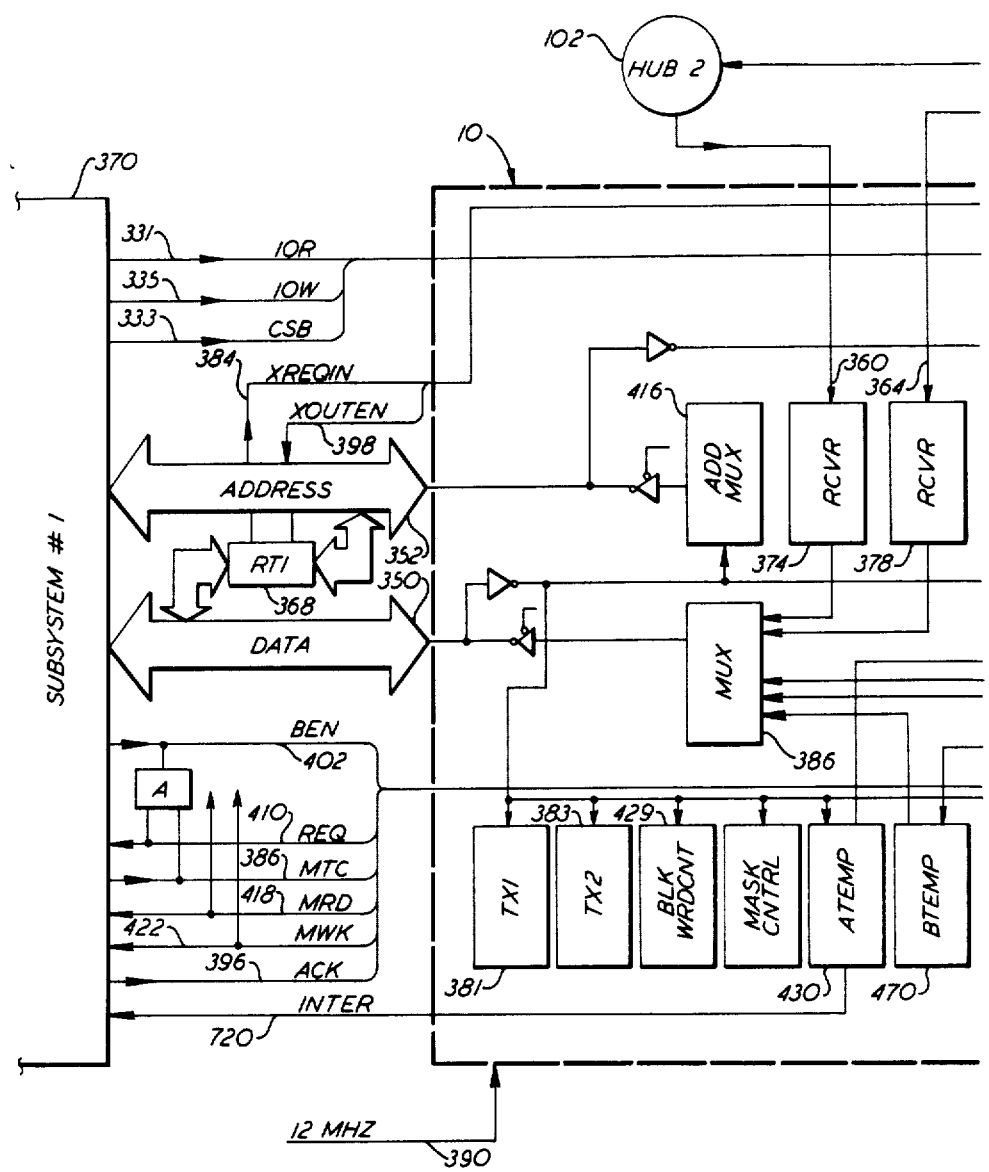
FIGS. 9A & 9B, arranged as shown in FIG. 9, are a simplified block diagram illustration of an embodiment of a modular multiport data hub, according to the present invention.
Figure 9:
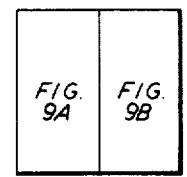
Figure 9B:
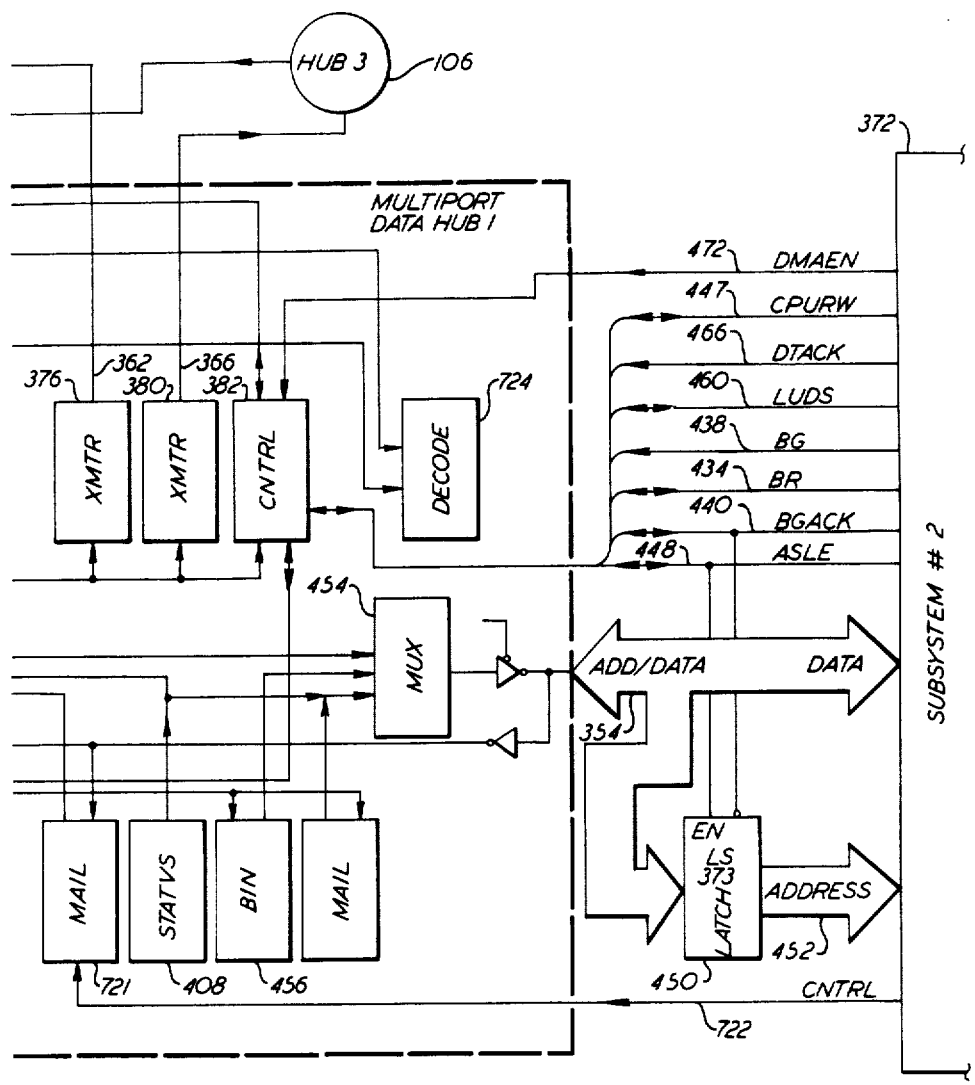

FIGS. 9A & 9B are a simplified block diagram illustration of an embodiment of a modular multiport data hub 10 according to the present invention. The particular embodiment illustrated in FIGS. 9A & 9B has two serial input/output ports and two parallel input/output ports. Subsystem #1 is the master CPU in this embodiment. The hub shown in FIGS. 9A & 9B could be used in the architecture of FIG. 3, for example. There, each hub interfaces with two serial data links and two parallel data links. It should be understood, that the particular embodiment shown in FIGS. 9A & 9B which, as pointed out, may be used to advantage in the architecture of FIG. 3, is merely one of a large variety of internal structures which could be selected for particular embodiments of the modular multiport data hub according to the present invention. The embodiment shown in FIGS. 9A & 9B should be understood therefore as merely illustrative of an embodiment for a particular system architecture using the teachings of the present invention.

The structure of the two parallel input/output ports of the particular embodiment of FIGS. 9A & 9B include a separate data bus 350 and a separate address bus 352 at a first parallel port and a multiplexed data/address bus 354 at a second parallel port. The address output from the hub 10 to subsystem #2 on lines 354 at the second parallel port must be latched externally before data is sent out or received over those same lines.

Of course, it will be understood that the peculiarities of the particular address, data, and control line structures disclosed herein (in connection with FIGS. 9A & 9B) which link the hub to its satellite subsystems, hubs, etc., are mere expedients dictated by the circumstances of the particular embodiment shown. Therefore, many other data transfer linking structures are contemplated to be within the scope of this invention and those disclosed herein should in no way be construed as limiting the scope of this invention.

The multiport data hub 10 of FIGS. 9A & 9B are shown interfaced to two additional multiport data hubs 10a, 10b with which it communicates via serial lines 360, 362, 364, 366, MIL-STD-1553 remote terminal interface (1553 RTI) 368, a subsystem number 1 370 and a subsystem 2 372, these last two being similar to the subsystems shown in FIGS. 6A & 6B. Both subsystems numbers 1 and 2 include a CPU unit and a memory unit (not shown). As mentioned, subsystem #1 is the master in this embodiment.

The particular embodiment of the modular multiport data hub 10 according to the present invention pictured in FIGS. 9A & 9B handles data transfers of six types. Transfers take place between the multiport data hub 10 and subsystem number 1 370, the two data hubs 10a, 10b via two Manchester transmitter/receiver pairs 374, 376 and 378, 380, the 1553 RTI 368, and subsystem number 2 372. The following prioritized DMA transfers are possible in the embodiment illustrated:

1. Transfer from/to the 1553 RTI to/from subsystem number 1.
2. Transfer from hub number 3 10b to the subsystem number 1's memory.
3. Transfer from hub number 2 10a to subsystem number 1's memory.
4. Transfer to hub number 3 10b from subsystem number 1's memory.
5. Transfer to hub number 2 10a from subsystem number 1's memory.
6. Transfer from/to subsystem number 1's memory to/from subsystem number 2's memory.

The DMA requests are asynchronous to the control logic contained in a control block 382. The requests for each transfer are prioritized in the above order where number 1 is the highest priority and number 6 the lowest. Each of the six transfers may be individually disabled by a mask word written by the data transfer control (master) CPU, in this case within master subsystem #1. Sixteen-bit address buses 352, 354 provide a full 64K addressing space on both the subsystem number 1, the 1553 RTI, and the subsystem number 2 buses.

The master CPU programs the hub to provide address pointers, word counts, and to enable the desired channels for data transfers. FIGS. 15A & 15B show word definitions for various sixteen-bit words transferred over the data lines 350 of FIGS. 9A & 9B in conjunction with read and write decode instructions sent over the address lines 352 from subsystem 1 to the hub. In the case of the data lines, the sixteen-bit words are sent to various reoisters within the hub. In the case of the read and write decodes, a read decode is signaled to the hub by an IOR signal on a line 331 occurring in conjunction with a chip select (CSB) signal on a line 333 and a write decode is signaled by a IOW signal on a line 335 occurring in conjunction with the chip select signal.

To program the hub, subsystem #1 first writes the address pointers to the appropriate registers within the hub using the appropriate write decode. Then subsystem 1 initialzes the proper word count register, again using the appropriate write decode. Finally, the desired channels are enabled by subsystem 1 using write decode 9.

1553 RTI TRANSFER DESCRIPTION

In preparation for a transfer, the 1553 RTI 368 will assert a request line 384. This request has the highest priority of all of the possible six types of transfers. The data hub 10 will respond to this request if all the following are satisified:
1. DMA channel 1 is enabled.
2. The current DMA cycle has completed, i.e., the hub is not currently servicing another channel.
3. MTC from subsystem number 1 goes low, i.e., a memory toggle clock signal on a line 386.

Figure 10:
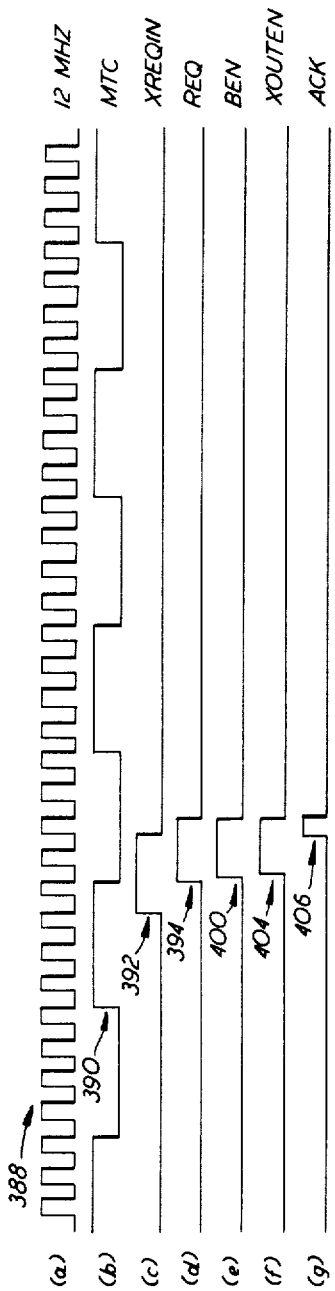
FIG. 10 is a timing diagram showing some typical waveforms for a serial transfer using the hub of FIGS. 9A & 9B.

Referring now to FIG. 10, a timing diagram showing some typical waveforms for a 1553 RTI transfer (external request DMA cycle) are shown. In FIG. 10(a) is illustrated a waveform 388 illustrative of a 12 MHz signal on a line 390 in FIGS. 9A & 9B. FIG. 10(b) is an illustration of a memory toggle clock (MTC) signal waveform 390 illustrative of the signal on the line 386 from subsystem number 1's CPU. When MTC is high, DMA transfers are permitted. When MTC is low, the individual subsystem CPUs are permitted access to their own associated memory units. MTC is used to prioritize requests for subsystem #1 which is helpful in arbitrating the bus. It should be noted that MTC, in some implementations, may not always be a regularly recurrent signal, as shown, but may vary its pulse width in accordance with the processor clock rate and software instructions being executed (see FIG. 14 for an MTC "slowdown"). Since both data transfers and internal prioritization of transfer requests are dependent on the falling edge of MTC from subsystem #1, varying MTC will affect DMA transfers. Usually, for the particular implementation illustrated in FIG. 10, MTC will pulse periodically except for multiply, divide, and shift group instructions during which MTC is held, even though multiple ACK pulses occur. The data hub only utilizes the first acknowledge pulse and ignores the others during this period. Therefore, the occurrence of these instructions reduces the effective transfer rate of the data hub.

FIG. 10(c) shows a waveform 392 illustrative of the external request signal on the line 384 issued by the RTI 368 in preparation for a transfer. FIG. 10(d) shows a waveform 394 illustrative of a request signal on a line 410 from the hub 10 to subsystem #1. FIG. 10(e) shows a bus enable waveform 400 indicative of the signal on the line 402, the waveform indicative of subsystem #1 enabling its buses for an impending data transfer.

Similarly, FIG. 10(f) shows a waveform 404 indicative of the hub enabling its buses 350, 352 for the impending transfer. After the transfer is completed, an acknowledge signal is provided on line 396 as illustrated by a waveform pulse 406 as is shown in FIG. 10(g).

MANCHESTER RECEIVER TRANSFER DESCRIPTION

Each of the Manchester receivers 374, 378 will request a word transfer after a word reception is complete in its associated internal register. The words are received asynchronously and the receivers include means for autonomously receiving and assembling serially received words into the parallel format required by the data hub. The two receivers, 374, 378, are assigned priority levels 2 and 3, respectively. The data hub 10 will respond to these requests if:

1. The respective DMA channel (2 or 3) is enabled by a write decode 0 or 1 (WR0 or WR1 in FIGS. 15A & 15B). This means the proper address pointer is present in an associated register and the channel has been enabled by a write decode 9 (bit D2 or D3 in FIGS. 15A & 15B (CH2 or CH3)).
2. A receiver RCVxRDY flag is active, i.e., the receiver has completely decoded a full sixteen bit word. When decoding is completed, the receiver sets an internal RCVxRDY flag (bit D16 or D15 in the READ STATUS WORD of FIGS. 15A & 15B) indicating the receiver is ready to transfer its contents (RX2 RDY or RX1 RDY). This flag is readable in a status register 408.
3. No higher requests are pending.
4. The current DMA cycle has completed, i.e., the last DMA cycle that occurred has been completed.
5. MTC from the CPU in subsystem 1 370 falls.

Figure 11:
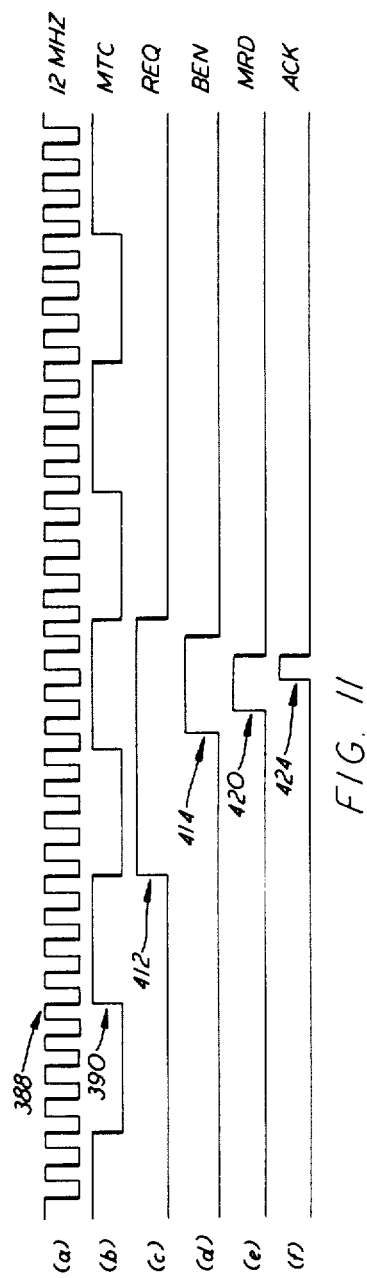
FIG. 11 is a timing diagram for illustrating the sequence of events within the data hub of FIGS. 9A & 9B during a Manchester transmitter transfer.

After these requirements are satisified, a request is asserted on a line 410 by the data hub 10 to the CPU in subsystem number 1 370. FIG. 11(c) shows a REQ waveform 412 in relation to an MTC waveform 390 in FIG. 11(b) and a 12 MHZ signal waveform 388 in FIG. 11(a). After the MTC signal on the line 370 rises and the bus enable signal on the line 402 is raised (see waveform 414 in FIG. 11(d)) by control logic in subsystem #1, the data hub 10 will assert the address pointer on address lines 352, the receiver data on data lines 350 is provided by a multiplexer 386, and a memory read (MRD) signal is provided on a line 418 as shown by a waveform 420 in FIG. 11(e). An acknowledge signal on the line 396 indicates the transfer is complete and the data bus 350 is disabled on the rising edge of the acknowledge signal (waveform 424 in FIG. 11(f)) along with the RCVxRDY flag. The request signal on the line 410 (waveform 412 in FIG. 11(c)) is then removed when the MTC signal on the line 386 falls.

MANCHESTER TRANSMITTER TRANSFER DESCRIPTION

Each of the two Manchester transmitters 376, 380 may request a word transfer when its associated transmitter buffer is empty (i.e., the TXxEMP flag (in bit 13 or 14 of the status word register) is active)), and the word transfer count on that channel is not zero. It takes 20 microseconds, in the embodiment illustrated, for a Manchester Transmitter to transmit one word. While the transmitter is busy, the TXxEMP flag (transmitter register is empty) is held false indicating it is not ready to be loaded with another word. This flag is readable in the status register 408. The two transmitters 376, 380 are assigned priority levels 4 and 5, respectively. The multiport data hub 10 will respond to those requests if:

1. The respective multiport data hub channel (4 or 5) is enabled. This means subsystem 1 has set up the address pointer which the hub uses in retrieving info from subsystem 1's memory. The address pointer is set up by subsystem 1 asserting a write decode 2 or 4 (see FIGS. 15A & 15B), i.e., by placing a binary 2 or 4 on the address lines 352 and placing the address pointer on the data lines 350 for storage in TX1 or TX2 registers 381, 383. It also means subsystem 1 has asserted a write decode 3 or 5 whereby the address lines assert a binary 3 or 5 and the data lines contain the count (in the first eight bits) for placement in a word count register. Finally, subsystem 1 would have enabled the transmitter by asserting a write decode 9 and placing a binary 1 in channel 4 or 5's D4 or D5 bits (see FIGS. 15A & 15B).
2. The TXxEMP flag is active and the TXx word count is not zero.
3. No higher requests are pending.
4. The word transfer count is not zero.
5. The current DMA cycle has completed.
6. MTCB from subsystem number 1's CPU falls.

Figure 12:
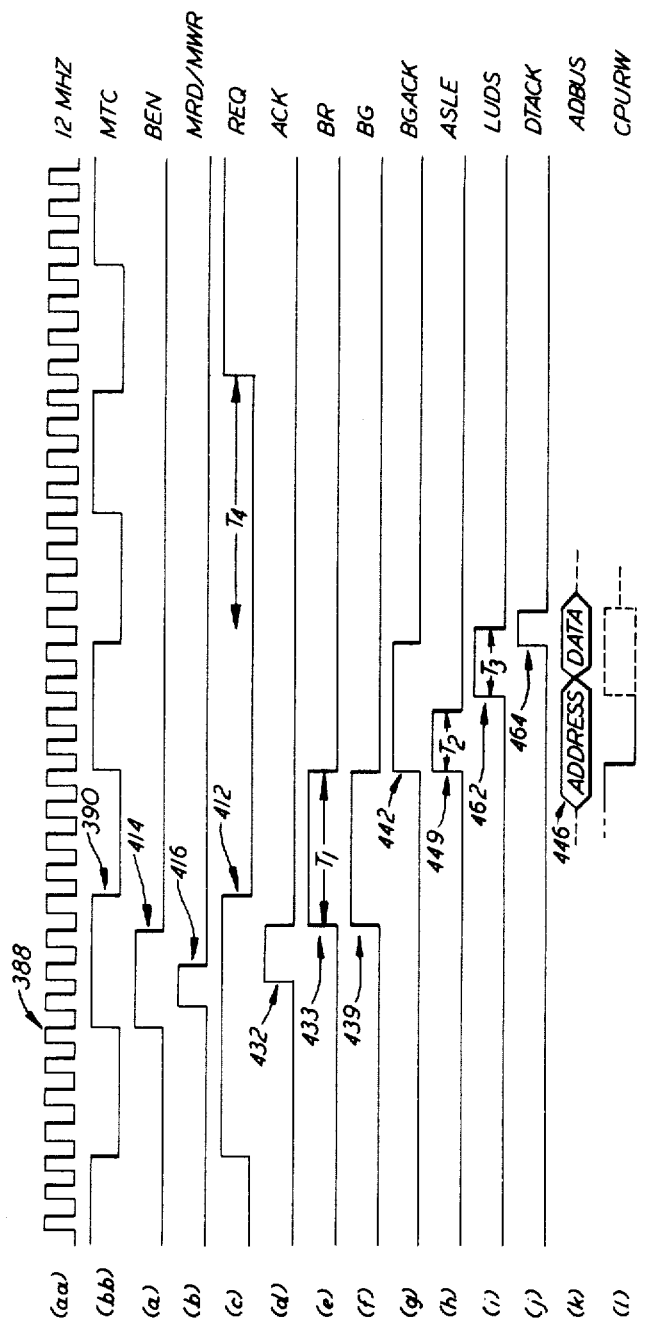
FIG. 12 presents a number of waveforms showing some of the timing relationships involved in transferring data between the CPUs within subsystems 1 & 2 of FIGS. 9A & 9B. The timing shown illustrates a one word block transfer.

After these conditions are met, the multiport data hub 10 asserts a request (REQ) on line 410 for subsystem number 1's bus as shown by a waveform 412 in FIG. 12(c). FIG. 12(aa) shows a 12 megahertz clock pulse waveform 388 corresponding to the signal present on line 390 of FIGS. 9A & 9B. FIG. 12(bb) shows a waveform 390 corresponding to the MTC signal present on the line 386 of FIGS. 9A & 9B. FIG. 12(a) shows a waveform 414 corresponding to the BEN signal on the line 402 of FIGS. 9A & 9B. FIG. 12(b) shows a waveform 416 corresponding to either the MWR sional on the line 422 or the MRD signal on the line 418. FIG. 12(d) shows a waveform 432 corresponding to the ACK signal on the line 396.

After a request is asserted by the data hub for the subsystem number 1 bus and after the MTC signal rises as shown in FIG. 12(bb) the bus enable signals (BEN) on the line 402 (waveform 414) is asserted. Assuming a memory write is asserted on the line 422, during the enable period the subsystem #1 memory writes the addressed data from memory to the hub as indicated by the MWR signal waveform 416. An acknowledge signal waveform 432 is asserted as shown in FIG. 12(d). The data is latched in the transmitter 376 or 380. When the acknowledge signal in waveform 432 falls, the word count is decremented and the TXxEMP flag is cleared. The address pointer is incremented on the rising edge of the acknowledge signal on the line 396 as shown in FIG. 12(d). The request signal on the line 410 is then removed on the falling edge of the first 12 megahertz clock after the acknowledge signal on the line 396 is released.

Thus, to summarize the sequence of events which occur during a transmitter transfer, the transmitter buffer 376 or 380 becomes empty, i.e., the TXxEMP flag becomes active and the transmitter is indicating that it is ready to transmit more information, the data hub issues a request for more data to the CPU in subsystem number 1, the CPU enables its data bus during a MTC high period and tri-states the subsystems's address/data lines, the CPU sends an acknowledge to the data hub to indicate that the DMA has occurred and the multiport data hub increments its address register to point to a new address for the next transfer. At that time, the data is also ready for serial transfer from the transmitter to one of the hubs 10a, 10b.

BLOCK TRANSFERS BETWEEN PROCESSORS

The multiport data hub 10 of FIGS. 9A & 9B will support transfers in either direction between the processor memories in subsystem number 1 370 and subsystem number 2 372. This type of transfer has the lowest priority and is executed when:
1. DMA channel 6 is enabled.
2. No higher requests are pending.
3. The block transfer word count is not zero.
4. The current DMA cycle has completed.
5. The MTC signal on the line 386 of FIG. 9 falls.

Transfer direction is determined by the $9^{th}$ bit in an internal word count write (see write decode 8 (BLK WRD CNT) in FIGS. 15A & 15B) which is stored in a BLK WRD CNT register 429. A high $9^{th}$ bit indicates a read cycle on the subsystem 2 side and write cycle on the subsystem 1 side. Likewise, a low bit indicates a read cycle on the subsystem 1 bus followed by a write cycle on the subsystem 2 bus.

The assumption that DMA channel 6 is enabled means that the subsystem 1 block address pointer (see write decode 6 in FIGS. 15A & 15B) has already been initialized by subsystem 1. Thus, the subsystem 1 block address pointer contains the address from which data is to be obtained from subsystem 1 in a subsystem 1 to subsystem 2 transfer or the address in subsystem 1 in which data is to be stored in a subsystem 2 to subsystem 1 transfer. Similarly, the subsystem 2 block address pointer (see write decode 7 in FIGS. 15A & 15B) will also have had an address placed therein either from which or to which the hub will obtain or put information on a transfer between subsystems. The block word count (BLK WRD CNT) register will also have been initialized upon enablement by the enablement of bit 6 in write decode 9 (MASK AND ENABLE WORD) of FIGS. 15A & 15B.

With the $9^{th}$ bit of the word count low, i.e., with an indication that a data transfer from subsystem number 1 370 to subsystem number 2 372 in FIGS. 9A & 9B, the multiport data hub 10 initiates a read DMA cycle with subsystem number 1 370 as explained above in connection with a transfer from subsystem number 1 to a transmitter except that the data incoming to the data hub is stored in an ATEMP register 430 instead of a transmitter register 376, 380. The data is latched into register 430 using the rising edge of the acknowledge signal on the line 396 (see waveform 432 of FIG. 12(d)). Upon the falling edge of the acknowledge signal on the line 396, a bus request BR (see waveform 433 in FIG. 12(e)) signal on a line 434 is asserted by the control unit 382. After the CPU in subsystem 2 is free, i.e., after a bus grant signal on a line 438 goes high (see waveform 439 in FIG. 12(f)), the bus grant acknowledge on the line 440 is asserted by the hub indicating that the previous bus cycle is completed (see waveform 442 in FIG. 12(g)) and that the hub is now the bus master.

The destination address is then asserted on the multiplexed address/data bus (see waveform 446 in FIG. 12(k)) and when a stable address is present, an ASLE signal on a line 448 (see waveform 449 of FIG. 12(h)) is asserted by the hub. This latches the address information in a latch 450 for presentation on address lines 452 to subsystem #2. The address is provided by a multiplexer 454 which receives the address from a BIN register 456. The BIN 456 receives programmed address information from subsystem #1 over data lines 350.

The data is then written to the subsystem #2 memory by the control unit 382 by asserting the LUDS signal on the line 460. (See waveform 462 in FIG. 12(i)). The cycle is ended by an acknowledge signal illustrated by waveform 464 in FIG. 12(j) on the line 466 being asserted by subsystem #2. When the data acknowledge is first asserted at the end of the cycle, it first is synchronized with the 12 megahertz clock signal on the line 390. This is then used to end the cycle by tri-stating all subsystem 2 lines and removing the request, and also indicating the end of the cycle to subsystem 2.

When the $9^{th}$ bit of the block word count is equal to one, the multiport data hub first executes a read cycle on the subsystem 2 side, temporarily latches it internally in a data latch 470 then performs a write cycle on the subsystem 1 side.

In all of the above cases, the falling edge of the acknowledge signal on the line 396 or on the line 466 as respectively shown in illustration (d) of FIG. 12, and illustration (j) of FIG. 12 decrements the block word counts. The rising edge of the acknowledge signals increment the respective address pointers. In the case of block moves from subsystem 1's memory to subsystem 2's memory the acknowledge is the synchronized acknowledge on the line 466 of FIGS. 9A & 9B. When an enable signal on a line 472 is negated, the current prioritized request is cleared (thus the request signal on line 410 is cleared, see FIG. 12(c) and inhibits further requests from ocurring. This does not affect any of the fundamental requests; hence, when the enable signal on line 472 is again asserted, the falling edge of MTC will reprioritize and issue a new request if necessary.

Figure 13:
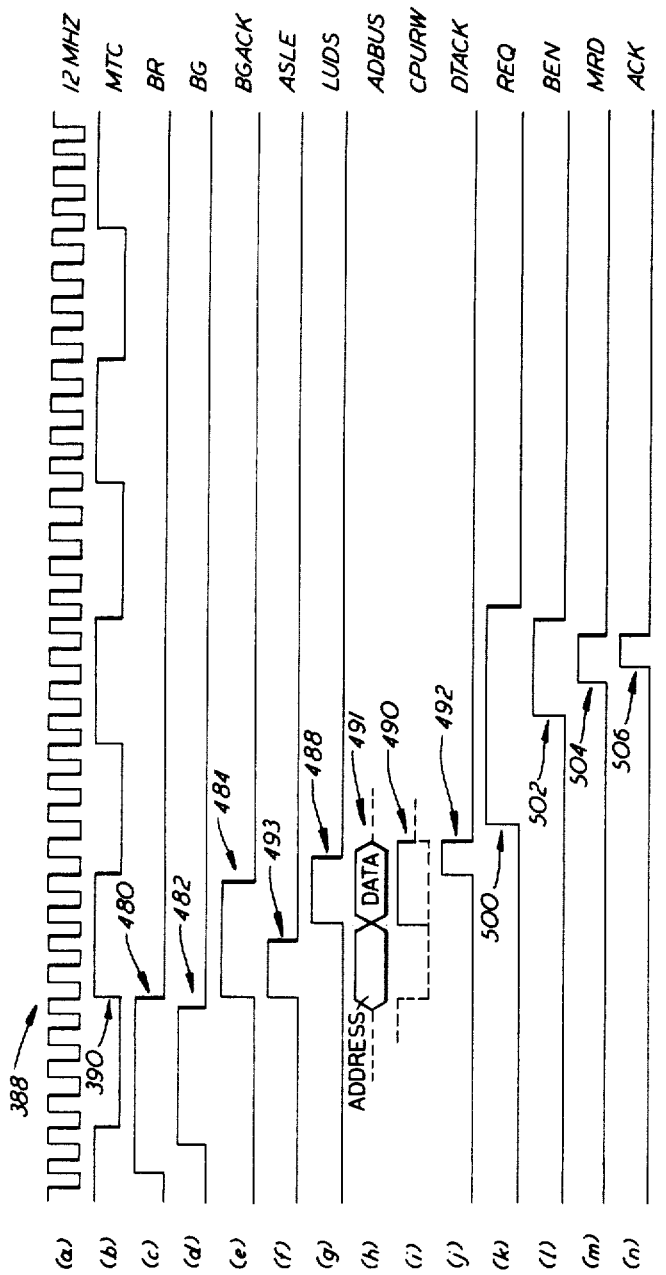
FIG. 13 illustrates some of the timing relationships between signals involved in transferring data in FIGS. 9A & 9B from subsystem 1 to subsystem 2.

Referring now to FIG. 13, a number of waveforms are presented for showing some of the timing relationships involved in transferring data from subsystem 2 372 to subsystem 1 370 of FIGS. 9A & 9B. A waveform 388 in FIG. 13(a) shows the 12 megahertz signal on the line 390 in FIGS. 9A & 9B. The MTC signal on the line 386 is shown as a waveform 390 in FIG. 13(b). The bus request signal on the line 434 from the hub to subsystem 2 is shown in FIG. 13(c) as a waveform 480. The bus grant (BG) and acknowledge (BGACK) signals on the lines 438 and 440 are shown as waveforms 482 and 484, respectively, in FIGS. 13(d) and (e). The sequence of events for a block move from subsystem 2 to subsystem 1 is as follows: First, the data hub 10 issues a subsystem 2 bus request on the line 434. Once subsystem 2 is free, it issues a bus grant signal on a line 438 as shown in waveforms 480 and 482 of FIGS. 14(c) and (d). The data hub then issues a bus grant acknowledge signal on the line 440 (see waveform 484 in FIG. 13(e)), gates off the bus request signal on the line 434, drives the subsystem 2 read/write line 447 low (see waveform 490 in FIG. 13(i)), and asserts the destination address on the multiplexed address/data bus 354 (see waveform 491 in FIG. 13(h)). After the address is stable, the data hub asserts the ASLE signal on the line 448 (address strobe input to hub/latch enable output from hub; see waveform 493 of FIG. 13(f)) which demultiplexes the address from data 450. The data stored in the strobed address within subsystem 2 is then "pathed" onto the A/D bus 354 to temporary register 470 (BTEMP) by the data hub's assertion of the R/W signal on the line 447 for the purpose of directing the flow of data into the hub and also the LUDS signal on the line 460. See waveforms 488 and 490 in FIGS. 13(g) and (i), respectively.

Thus, the data hub receives data from subsystem 2 on lines 354 into temporary data storage register (BTEMP) 470 by means of the data strobe signal (LUDS) on the line 460. The end of the subsystem 2 cycle is indicated by the DTACK signal waveform 492 in FIG. 13(j). The data hub then generates an internal bus request back to its control unit 382. The MTC signal latches in the bus request, and issues a request on line 410 to subsystem 1 if there is then no higher priority request pending. This is shown as waveform 500 in FIG. 13(k). In turn, subsystem 1 issues a bus enable signal on the line 402 as shown in FIG. 13(l), waveform 502, to start the data transfer; this also tri-states the subsystem number 1 with respect to the address/data lines 352, 350. The data transfer from register 470 through multiplexer 386 onto data lines 350 to subsystem 1 then takes place. This is signified in FIG. 13(m) by waveform 504 and FIG. 13(n) by waveform 506. The transfer is initiated by the data hub after receiving the bus enable on line 402. After the transfer is finished subsystem 1 indicates that DMA has ocurred and that data has been written to the subsystem 1 memory by initiating an acknowledge signal on the line 396 (see FIG. 13(n) for the acknowledge signal). Both address pointers are then incremented and the word count decremented. If the word count is not zero the entire process is repeated again until it is.

TIMING REQUIREMENTS FOR DMA TRANSFERS

Figure 14:
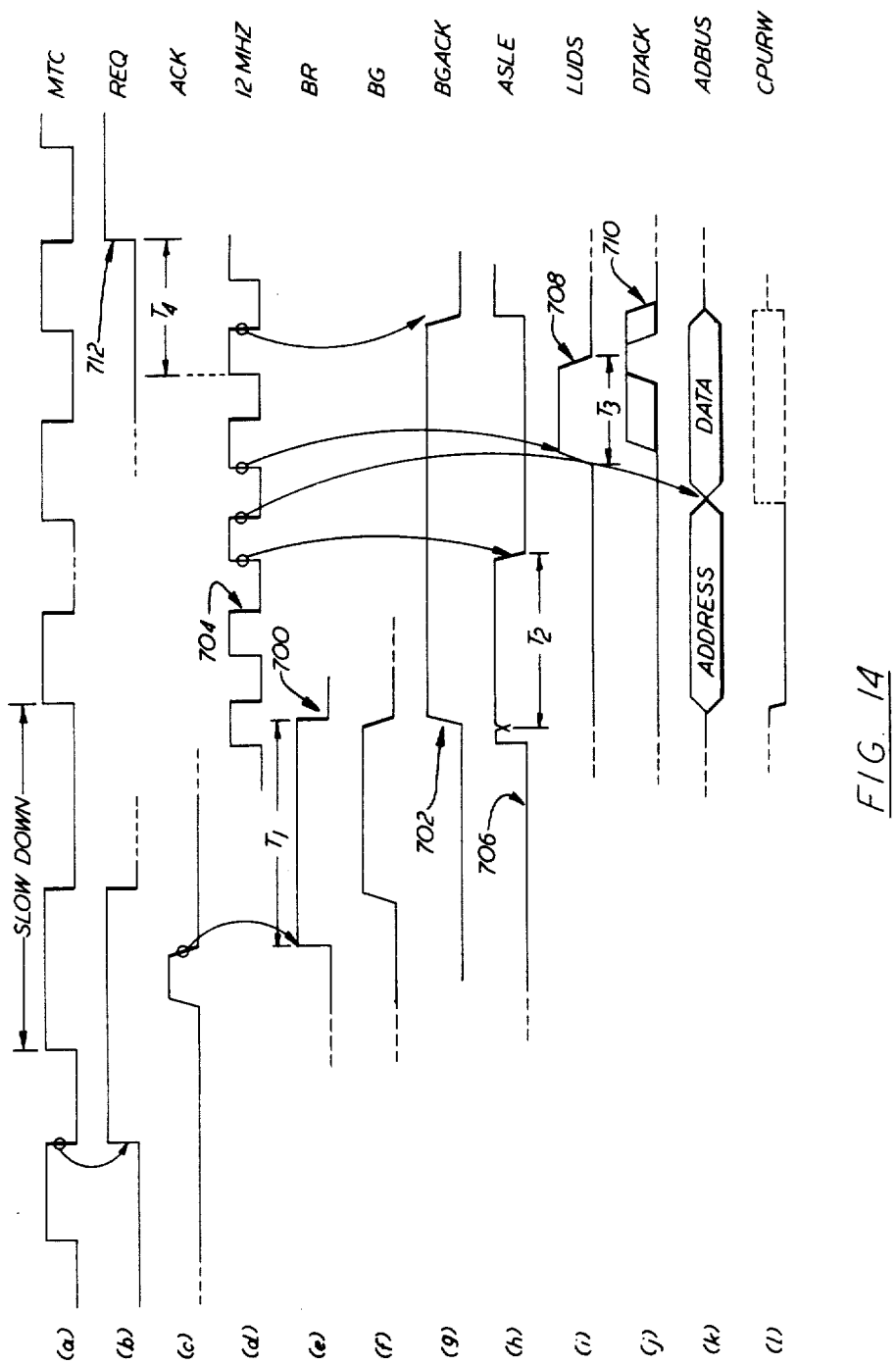
FIG. 14 shows the timing of a one word block transfer in FIGS. 9A & 9B from subsystem 1 to subsystem 2.

FIG. 14 shows the timing of a one word block transfer from subsystem 1 to subsystem 2. $T_1$ through $T_4$ of FIG. 12 vary due to synchronization of the data hub with the two processors. Transfers on the subsystem #1 side are aligned with the MTC signal. Transfers on the subsystem #2 side are aligned with the 12 MHz signal. Although the transfer on the subsystem #2 side of FIG. 13 shows the signals between the hub and subsystem 2 aligned with the MTC signal, it should be understood that this is not necessarily so. For example, in FIG. 14, there is no relation shown between the MTC signal and the signals between the hub and subsystem #2.

$T_1$ through $T_4$ derived herein are based on the hub interfacing to a Motorola MC68000 in subsystem 2. It will be understood, however, that timing will vary when other processors are used.

$T_1$ is the time from the hub issuing a bus request to subsystem 2 to the bus grant acknowledge from subsystem 2. Based on the MC68000 specificatins, the minimum time for $T_1$ is one and a half times the period of the controlling CPU's running frequency, which in the particular implementation illustrated is CPU 2 running at 8 megahertz. Similarly, the maximum time for $T_1$ is four times the controlling CPU running period, which in this case is 500 nanoseconds. This time is dependent upon where in the CPU 2 instruction cycle the bus was requested. If requested in the middle of a cycle, the data hub must wait until ASLE is negated before it can take the bus. Thus, referring to FIG. 14(e) a waveform 700 is illustrated showing the bus request signal to the requesting device from the data hub and the time until it is negated by the falling edge of a bus acknowledge signal shown as waveform 702 in FIG. 14(g).

The time, $T_2$, from the bus grant acknowledge signal 440 active until a valid address appears on the AD bus 354, as indicated by the signal ASLE on the line 448 falling, i.e., demultiplexing address from data, is minimally 83 nanoseconds (one cycle of 12 MHz) and may, at a maximum, be a long as 167 nanoseconds. This variance is due to the internal synchronization of the acknowledge signal with the 12 megahertz clock signal. I.e., the BGACK signal on the line 440 (waveform 702 in FIG. 14(g)) is asynchronous with respect to the 12 MHz signal and may occur anywhere within a one cycle (83 nsec) window of 12 MHz. Thus, the 12 megahertz signal is shown by waveform 704 in FIG. 14(d) as triggering the ASLE signal falling edge a shown in waveform 706 in FIG. 14(h). The duration, $T_2$, from the rising edge of the bus grant acknowledge as shown in waveform 702 and the falling edge of the ASLE signal as triggered by the second rising edge of the 12 megahertz clock signal after BGACK as shown in waveform 704 of FIG. 14(d) is, as discussed above, 83 nanoseconds minimum and 167 nanoseconds maximum.

The duration of the LUDS signal on the line 460 of FIGS. 9A & 9B, as shown in FIG. 14(i) waveform 708 is a minimum of 83 nanoseconds and a maximum of some integer times 83 nanoseconds. This time is dependent on the synchronization of the LUDS signal with the DTACK signal 466 as shown in a waveform 710 of FIG. 14(j). The minimum time is obtained by grounding the DTACK signal on the line 466. As shown in FIG. 14(i) the falling edge of the LUDS waveform 708 occurs on the rising edge of the first 12 megahertz clock pulse after the address is finished strobing into the external latch 450.

The internal prioritization of requests takes place during a time period signified by $T_4$ in FIG. 14(b) waveform 712. The internal prioritization period ($T_4$) begins after the negation of LUDS, i.e., after the data is strobed and lasts until the next request from CPU 1.

The time required for internal prioritazation of requests is dependent on other pending requests, the speed of the controlling processor, and the ocurrance of MTCB's falling edge and may be anywhere from 0 to 666 nanoseconds.

The transfer time is equal to $T_1+T_2+T_3+T_4+749$ nanoseconds ($666+83$ nanoseconds). The worst case additive transfer time (including a $T_3$ of nominally 332 nanoseconds) is 2,454 nanoseconds. The minimum additive transfer time is 1,351 nanoseconds. To program the data hub, the address pointer(s) are first written. The word count registers are then initialized. Finally, the desired channels are enabled.

The two Manchester receiver DMA channels are, in the particular embodiment shown herein, equipped with only an incrementing 16-bit address pointer counter. No word count register is available. However, it should be understood that a word count register could, of course, be provided in another embodiment. Therefore, in this particular embodiment, a receiver will continue to store data in adjacent locations until the receiver channel is disabled.

A lock step mode is useful, according to the present invention, in controlling the number of words transfered via DMA by the receivers (see bits 7 and 8 of write decode 9 and read decode 4 of FIGS. 15A & 15B). Three flags per receiver are available in the status word (see read decode 2 of FIGS. 15A & 15B) to determine the state of the receiver channels. RX1 and RX2RDY indicate that a word is decoded and ready for transfer. This signal serves as a request to the priority logic. RX1BSY and RX2BSY indicate that receiver x is currently busy decoding a word. This signal is useful in determining when to disable a receiver DMA channel or when to change an address pointer. RX1 BLK VLD and RX2 BLK VLD are true if all past received words in a receiver had no parity nor Manchester error. This bit is cleared when CPU 1 reads the receiver buffer or when a new receiver address pointer is written.

Thus, the lock-step mode feature that is provided in the best mode embodiment offers a means for redundant channels to remain somewhat synchronized (see bits 6 & 7 of write decode 9 in FIGS. 15A & 15B). In this mode, transmitter and receiver DMA cycles are interweaved. Thus, a load transmitter DMA cycle must be followed by a store receiver DMA cycle which is dependent on the RXxRDY flag and independent of the TX×EMP and XMTR×WC>0 flags. Likewise, a store receiver DMA cycle must be followed by a load transmitter DMA cycle which is dependent on the TX×EMP and XMTR×WC>0 flags and independent of the RCV×RDY flag. Upon loading the respective transmitter word count register, the transmitter DMA channel is enabled and reciever requests are blocked. Link pairs 1 and 2 may be independently put in lock-step mode through a write decode. Lock-step enable bits are readable in the enable read.

The link pairs may also independently be put in a self-test wrap-around mode. In this mode, the transmitter output is directed to the receiver input and the external Manchester outputs are disabled. The wrap-around mode enable bits are readable in the enable read. The system is not in self test upon power-up.

MASKABLE INTERRUPT

Each data hub has an external open drain interrupt line 720 (INTR) shown in FIGS. 9A & 9B. This line is programmable to respond to any combination of eight independent interrupt conditions:

1. Interrupt when TX1 buffer is empty.
2. Interrupt when TX2 buffer is empty.
3. Interrupt when a word is ready in RCV1.
4. Interrupt when a word is ready in RCV1.
5. Interrupt when TX1 DMA block transfer is done.
6. Interrupt when TX2 DMA block transfer is done.
7. Interrupt when a DMA block move is done.
8. Interrupt when mailbox data is available.

All conditions are maskable through the upper byte of write decode nine (see FIGS. 15A & 15B). The mask register and all interrupt conditions are readable in the status reads (see read decode 4 in FIGS. 15A & 15B).

A 16 bit word may be written to the DMA1 by subsystem 2 to a mailbox register 721. The data is located into the mailbox register on the rising edge of LUDSB when CPURW on the line 447 and a CTRL signal on a line 722 are low. When written to, a MBX DTA AVLB flag is set in bit 1 of read decode 2 (see FIGS. 15A & 15B-READ STATUS WORD) indicating mailbox data is available. This bit is cleared when subsystem 1 reads the mailbox data on the data bus 350 through multiplexer 386.

Subsystem 1 may also send mail to subsystem 2. A decode unit 724 decodes bit 16 of write decode 9 to write to an internal 11 bit latch. The latch is readable on the subsystem 2 bus. The upper 6 bits of the read consist of status information inside the hub. Once written to by subsystem 1, a MXB DTA AVLB flag is set in bit 8 of read decode 2 (see FIGS. 15A & 15B-READ STATUS WORD). This flag is cleared when subsystem 2 reads the mailbox through multiplexer 454.

An option is provided so that subsystem 1 may indirectly DMA a word of data anywhere in the 64K address space of subsystem 2. To send one 16 bit data word to subsystem 2, subsystem 1 first sets up the subsystem 2 pointer (see write decode 12 in FIGS. 15A & 15B) to point to the destination address of the one word. Then subsystem 1 writes the data to the hub which initiates the DMA transfer of the data into subsystem 2. This should not be used while the block transfer DMA channel is enabled.

It will be understood by those skilled in the art that various changes, deletions, and modifications to the embodiments shown herein may be made without departing from the spirit and scope of the invention.

We claim:

1. A data hub for controlling data flow between a plurality of data source/destination units interconnected to the hub via control signal lines and via parallel address/data signal lines, the source/destination units having addressable memory locations, the data hub being responsive to at least one pair of address pointer input control signal words, to a word count input control signal word and to a channel enable input control signal word provided by a master source/destination unit, said input control signal words being indicative of one or more scheduled data signal word transfers to be effected by the hub from one or more memory locations within a data SOURCE/destination unit used as a channel source unit in a channel enabled in the data hub by the channel enable input control signal word, the one or more scheduled data transfers to be effected by the hub from the SOURCE/destination unit to one or more memory locations within an enabled channel data sorce/DESTINATION unit used as a destination unit, the first of the one or more channel source unit memory locations indicated by a source address pointer input control signal word and the remainder by a number of sequential increments or decrements of the source address pointer input control signal word equal to the word count, the first of one or more destination memory locations indicated by a data transfer destination address pointer input control signal word and the remainder by a number of sequential increments or decrements of the destination address pointer control signal word equal to the word count, the data hub comprising:

storage means, for temporarily storing data transferred from the enabled channel data SOURCE/destination for later transfer to the enabled channel data source/DESTINATION; and control means, responsive to the source and destination address pointer input control signal words, to the word count and to the channel enable input control signal words, for providing a source data transfer request output signal to the enabled data SOURCE/destination unit and for subsequently receiving, in return, a source bus grant signal from the enabled data SOURCE/destination unit, said control means responsive to said source bus grant signal for providing said source address pointer input control signal word an an output signal to said enabled data SOURCE/destination unit, said storage means concurrently receiving and temporarily storing source data signal word from a memory location within the SOURCE/destination unit as indicated by said source address pointer output control signal word, said control means then providing a destination data transfer output request signal to the data source/DESTINATION unit and subsequently receiving, in return, a destination bus grant signal from the data source/DESTINATION unit, said control means responsive to said destination bus grant signal for providing said destination address pointer input control signal word as a destination address pointer output control signal word to said data source/DESTINATION unit and concurrently providing a transfer of said data signal word from said storage means to a memory location within said source/DESTINATION unit as indicated by said destination address pointer output control signal and, said control means incrementing or decrementing the source and destination address pointer output signals and decrementing the word count signal and cyclically repeating the transfer of data from the enabled channel's data SOURCE/destination unit to the data source/DESTINATION unit until the word count signal equals zero.

2. The data hub of claim 1, wherein said control means is further responsive to asynchronous incoming direct serial data signal word transfers to said storage means and to asynchronous serial data transfer request signal words from selected ones of said plurality of data source/destination units, and wherein said control means, in response thereto, categorizes scheduled data signal word transfers in a low priority transfer category, asynchronous incoming direct serial data signal word transfers in an intermediate priority transfer category, and asynchronous serial data transfer request signal words in a high priority transfer category, said control means providing prioritized data transfer request output signal words in keeping with said priority categories, and wherein said control means is responsive to said high priority asynchronous serial data transfer request signal words from a high priority data source/destination for providing an enable signal which permits said high priority data source/destination to immediately transmit/receive data signal words directly from/to another data source/destination, said control means also responsive to said intermediate priority asynchronous incoming direct serial data signal word transfers to said storage means for effecting said intermediate priority asynchronous incoming direct serial data signal word transfers after all transfers represented by high priority asynchronous serial data transfer request signal words are completed by providing a destination bus request signal to an intermediate priority data sorce/DESTINATION unit used as a destination unit and for subsequently receiving, in return, a destination bus grant signal from said intermediate priority data source/DESTINATION unit, said control means providing a data signal word transfer from said storage means to a memory address within said intermediate priority source/DESTINATION unit after said destination bus grant signal has been provided, said control means also responsive to said low priority scheduled data signal word transfers, for effecting the one or more low priority data signal word transfers after all transfers associated with high priority asynchronous serial data transfer request signal words and all intermediate priority data signal word transfers are completed.

3. A data hub for handling a plurality of data transfers between a plurality of data source/destination units, comprising:

storage means, for temporarily storing signals transferred from a data source/destination; and control means, responsive to a source address pointer input signal, to a destination address pointer input signal, to a word count input signal and to a channel enable input signal, each input signal provided by a master source/destination unit, said control means storing said address pointer signals and said word count signal in said storage means, said input signals being indicative of one or more scheduled data transfers to be sequentially effected in a series of data transfer cycles equal in number to the magnitude of said word count signal, said control means enabling a channel indicated by said channel enable signal, said hub effecting data transfer cycles from memory locations within a data SOURCE/destination unit in said enabled channel as indicated by said source address pointer input signal and said word count signal, to memory locations within a data source/DESTINATION unit in said enabled channel, as indicated by said destination address pointer input signal and said word count signal, said control means, for each of said data transfer cycles:
(1) providing a source data transfer request output signal to said data SOURCE/destination and
(2) subsequently receiving, in return, a source bus grant signal from said data SOURCE/destination, said control means responsive to said source bus grant signal for
(3) providing said source address pointer input signal as an output signal to said data source, said storage means receiving and temporarily storing source data from a memory location within said SOURCE/destination as indicated by said source address output signal, said control means then
(4) providing a destination data transfer output request signal to said data source/DESTINATION and subsequently receiving, in return, a destination bus grant signal from said data source/DESTINATION, said control means responsive to said destination bus grant signal for
(5) providing said destination address pointer input signal as an output signal to said data source/DESTINATION and providing a data transfer from said storage means to a location within said source/DESTINATION as indicated by said destination address output signal.

4. The data hub of claim 3, wherein said control means is further responsive to asynchronous incoming direct data transfers to said storage means for storage therein and to asynchronous transfer requests from selected ones of said plurality of data source/destination units, and wherein said control means priorities said scheduled data transfers as low priority, asynchronous incoming data transfers as intermediate priority, and asynchronous transfer requests as high priority, said control means providing prioritized data transfer request output signals in keeping with said priority order, and wherein said control means is responsive to said high priority asynchronous transfer request signals from a high priority data source/destination for providing an enable signal which permits said high priority data source/destination to immediately transmit/receive data from/to another data source/destination, said control means also responsive to said intermediate priority asynchronous incoming direct data transfers to said storage means for temporary storage therein and for effecting said intermediate priority asynchronous incoming direct data transfers after all tasks represented by high priority asynchronous transfer request signals are completed by providing a destination bus request signal to an intermediate priority data source/DESTINATION unit and for subsequently receiving, in return, a destination bus grant signal from said intermediate priority data source/DESTINATION unit, said control means providing a data transfer from said storage means to an address within said intermediate priority source/DESTINATION unit after said destination bus grant signal has been provided, said control means also responsive to said low priority scheduled data transfers, for effecting said low priority scheduled data transfers after all transfers associated with high priority asynchronous transfer request signals and all intermediate priority data transfers are completed.

* * * * *

UNITED STATES PATENT AND TRADEMARK OFFICE
CERTIFICATE OF CORRECTION

PATENT NO. : 4,724,520
DATED : 2/9/88
INVENTOR(S) : Peter M. Athanas et al

It is certified that error appears in the above-identified patent and that said Letters Patent is hereby corrected as shown below:

Column 2, line 46.   Cancel "FIF" and substitute -- FIFO --

Column 19, line 41.  Cancel "an an" and substitute
                     -- as an --

Signed and Sealed this

Tenth Day of January, 1989

Attest:

DONALD J. QUIGG

Attesting Officer        Commissioner of Patents and Trademarks